United States Patent
Suh

(10) Patent No.: US 6,792,204 B2
(45) Date of Patent: Sep. 14, 2004

(54) ELECTRONIC SHUTTER FOR CAMERA AND METHOD FOR CONTROLLING THE SAME

(75) Inventor: Jae-Gyeong Suh, Changwon (KR)

(73) Assignee: Samsung Techwin Co., Ltd. (KR)

( * ) Notice: Subject to any disclaimer, the term of this patent is extended or adjusted under 35 U.S.C. 154(b) by 0 days.

(21) Appl. No.: 10/390,217

(22) Filed: Mar. 17, 2003

(65) Prior Publication Data

US 2003/0175023 A1 Sep. 18, 2003

(30) Foreign Application Priority Data

Mar. 15, 2002 (KR) .................................. 10-2002-0014055

(51) Int. Cl.[7] .......................... G03B 13/32; G03B 9/08
(52) U.S. Cl. .................................... 396/90; 396/471
(58) Field of Search ........................... 396/90, 458, 471, 396/220, 463

(56) References Cited

U.S. PATENT DOCUMENTS

| | | | | |
|---|---|---|---|---|
| 4,572,645 A | * | 2/1986 | Yoshida et al. | 396/235 |
| 5,138,352 A | * | 8/1992 | Maeno | 396/389 |
| 5,729,783 A | * | 3/1998 | Depatie et al. | 396/508 |
| 5,832,319 A | * | 11/1998 | Seo | 396/90 |

* cited by examiner

*Primary Examiner*—Russell Adams
*Assistant Examiner*—Arthur A Smith
(74) *Attorney, Agent, or Firm*—St. Onge Steward Johnston & Keens LLC

(57) ABSTRACT

An electronic shutter for a camera includes a first driving force generating mechanism for generating driving force for moving a lens barrel in a direction of an optical axis, a lens barrel moving mechanism for moving the lens barrel by use of driving force from the first driving force generating mechanism, an adjusting mechanism for adjusting a focus adjusting to an initial position when electric power is applied or a shutter release operation is applied, a second driving force generating mechanism for generating driving force for driving three sectors, a sector opening/closing mechanism for opening and closing the sectors by use of driving force from the second driving force generating mechanism, and an exposure position detecting mechanism for detecting an exposure position by cooperating with the sector opening/closing mechanism. The exposure position detecting mechanism includes a photo reflector located on a motor base, a reflecting plate located on a shutter base, and an open lever rotatably coupled on the shutter base, the open lever being provided with a projection disposed between the photo reflector and the reflecting plate and rotating in response to rotation of the exposure ring.

20 Claims, 22 Drawing Sheets

ELECTRONIC SHUTTER FOR CAMERA AND METHOD FOR CONTROLLING THE SAME

FIELD OF THE INVENTION

The present invention relates to an electronic shutter for a camera and a method for controlling the same and, more particularly, to an electronic shutter with a large aperture and a control method thereof that can maintain a closed state of a sector even when outer shock is applied in a state where a main switch is turned Off, thereby improving the reliability of the camera.

BACKGROUND OF THE INVENTION

Generally, an electronic shutter of a camera has an automatic focusing function for adjusting the focus by measuring a distance to a subject and adjusting the position of a focus lens in response to the measured distance, and an automatic exposure function for adjusting the exposure of the camera by adjusting the combination of an iris speed and a shutter speed with respect to the optimum exposure amount of the subject.

Such an electronic shutter for a camera is disclosed in Korean Patent Nos. 10-015918 and 10-0180326 and Korean unexamined Patent No. 10-1999-015918.

The Korean Patent Nos. 10-0157516 and 10-1999-015918 disclose an electronic shutter that is designed to conduct the automatic focus and exposure functions by plural arc-shaped drive motors. The electronic shutter comprises a mechanical structure for receiving a lens barrel. The arc-shaped drive motor has a problem that a large space of a motor base is occupied by a stator and a rotor, deteriorating the freedom of design.

The Korean Patent No. 10-0180326 discloses an electronic shutter having plural can-shaped drive motors for realizing the automatic focusing and exposing. An exposure structure of the electronic shutter comprises three sectors to realize a large aperture. The can-shaped drive motor and the exposure structure having the three sectors are proposed to solve the problem of the arc-shape drive motor. However, when outer shock is applied in a state where a main switch of the camera is in an off-state, the sectors may be inadvertently opened to expose the film, thereby deteriorating the reliability of the camera.

SUMMARY OF THE INVENTION

Therefore, the present invention has been made in an effort to solve the above-described problems.

It is an objective of the present invention to provide an electronic shutter for a camera, which can minimize the space occupied by a stator and a rotor, thereby increasing the freedom of design.

It is another objective of the present invention to provide an electronic shutter that can realize a large aperture by employing three sectors in an automatic exposure structure.

It is a still another objective of the present invention to provide an electronic shutter control method that can remarkably reduce an error in an initial position of the shutter by improving the initial position setting method.

To achieve the objectives, the present invention provides an electronic shutter for a camera, comprising first driving force generating means for generating driving force for moving a lens barrel in a direction of an optical axis; lens barrel moving means for moving the lens barrel by use of driving force from the first driving force generating means; adjusting means for adjusting a focus ring to an initial position when electric power is applied or a shutter release operation is applied; second driving force generating means for generating driving force for driving at least one sector; sector opening/closing means for opening and closing the sector by use of driving force from the second driving force generating means; and exposure position detecting means for detecting an exposure position by cooperating with the sector opening/closing means, the exposure position detecting means comprises a photo reflector located preferably on a motor base; a reflecting plate located preferably on a shutter base; and an open lever rotatably coupled preferably on the shutter base, the open lever including a projection disposed between the photo reflector and the reflecting plate and rotating in response to rotation of the exposure ring.

Preferably, the lens barrel moving means comprises plural speed reduction gears mounted on the shutter base to receive driving force from the first driving force generating means and reduce rotational force; a power transmission gear rotating by receiving the rotational force from the speed reduction gears; and a focus ring coupled on the shutter base to be rotatable by the rotational force from the power transmission gear, the focus ring being provided at its inner circumference with a helicoids groove in which the lens barrel coupled to be movable in the direction of the optical axis.

Preferably, the sector opening/closing means comprises a gear rotating by the second driving force generating means; a connection gear engaged with the gear to move within a predetermined section of the shutter base by receiving rotational force from the gear, the connection gear being provided with at least one projection extending in the direction of the optical axis; an exposure ring rotatably coupled to the shutter base, the exposure ring being provided with a hook projection that can be limited in rotation by contacting the projection of the connecting gear, a projection fitted in the sectors to move the sectors and a gear formed on its outer circumference; an open lever engaged with the gear of the exposure ring to rotate together; and an open lever spring having a first end elastically supported on the open lever and a second end elastically supported on the shutter base.

Preferably, the first driving force generating means and the second driving force generating means are formed of a can-type stepping motor.

According to another aspect of the present invention, an electronic shutter for a camera comprises first driving force generating means for generating driving force for moving a lens barrel in a direction of an optical axis; lens barrel moving means for moving the lens barrel by use of driving force from the first driving force generating means; adjusting means for adjusting a focus ring to an initial position when electric power is applied or a shutter release operation is applied; second driving force generating means for generating driving force for driving at least one sector; sector opening/closing means for opening and closing the sectors by use of driving force from the second driving force generating means; exposure position detecting means for detecting an exposure position by cooperating with the sector opening/closing means; and sector open preventing means for preventing the sectors from opening when outer shock is applied in a main power-off state.

Preferably, the first driving force generating means and the second driving force generating means are formed of a can-type stepping motor.

Preferably, the lens barrel moving means comprises plural speed reduction gears mounted on the shutter base to receive driving force from the first driving force generating means and reduce rotational force; and a focus ring coupled on the shutter base to be rotatable by the rotational force from the reduction gears, the focus ring being provided with a projection extending toward the direction of the optical axis to rotate and move the lens barrel, helicoid-coupled to the shutter base, in the direction of the optical axis.

Preferably, the sector opening/closing means comprises a lever rotating by the first driving force generating means, the lever being provided with a projection extending the direction of the optical axis at an eccentric location; a first open gear rotatably surface contacting the projection of the lever, the first open gear being provided at its outer circumference with a gear and rotatably coupled on the shutter base; a second open gear coupled to the shutter base and engaged with the gear of the first open gear; an open lever coupled on the shutter base to be rotatable by the rotational force of the second open gear, the open lever being provided with a projection in the direction of the optical axis; an open lever gear for receiving the rotational force by the projection of the open lever; an exposure ring coupled on the shutter base to be rotatable by the rotational force of the open lever gear, the exposure ring being provided with a projection fitted in the sectors to move the sectors; and an open lever spring having a first end elastically supported on the open lever and a second end elastically supported on the shutter base.

Preferably, the exposure position detecting means comprises a photo reflector located on a motor base; a reflecting plate located on a shutter base; and an open lever rotatably coupled on the shutter base, the open lever being provided with a projection disposed between the photo reflector and the reflecting plate and rotating in response to rotation of the exposure ring.

Preferably, the sector open preventing means comprises a focus ring rotatably coupled on the shutter base and provided with a hook step in the direction of the optical axis; and an open lever rotatably coupled on the shutter base and provided with a suppression end projected in a radial direction so as to selectively contact the hook step of the focus ring.

According to still another aspect, the present invention provides a method for controlling an electronic shutter for a camera, comprising the steps of (S1) clearing counter_1 and counter_2 values detected by the photo interrupter 8 to a value "0"; (S3) controlling driving pulse such that a focus ring rotates counterclockwise by driving a stepping motor; (S5) determining if the detected value of the photo interrupter is a high value; (S7) increasing the counter_1 value by 1 when the value detected by the photo interrupter is the high value; (S9) determining if the increase value of counter_1 is consecutively detected above predetermined times; (S11) controlling the pulse such that the focus ring rotates clockwise when the value of the counter_1 is increased as many as the predetermined times; (S13) determining if the value detected by the photo interrupter is a low value; (S15) determining if the value applied to first and third coils of the stepping motor is the high value when the determined value is the lower value; and (S19) turning Off power of the stepping motor when the condition of the step (S15) is satisfied.

The method further comprises the step of returning the control procedure to the step (S3) when the increase value of counter_1 is not consecutively detected above the predetermined times in the step (S8).

The method further comprises the step of returning the control procedure to the step (S11) when the determined value is not the low value in the step (S13).

The method further comprises the step of (S17) controlling the pulse to rotate the focus ring clockwise when the value is not the high value in the step (S15) to return the control procedure to the step (S15).

The method further comprises the steps of (S21) increasing the counter_2 value by 1 when the valve detected by the photo interrupter is not the high value in the step (S5); (S23) determining if the counter_2 value is above predetermined value; (S25) controlling the focus ring to rotate clockwise when the condition of the step (S23) is satisfied in the step (S23); (S27) determining if the value detected by the photo interrupter is the high value; (S29) increasing the counter_1 value by 1 when the value is the high value in the step (S27); and (S31) determining if the value of the counter_1 is above a predetermined value and when this condition is not satisfied, the control procedure is returned to the step (S25), and when satisfied, the control procedure is returned to the step (S13).

The method further comprises the step of returning the control procedure to the step (S3) when the counter_2 value is above the predetermined value in the step (S23).

The method further comprises the step of keeping driving the focus ring clockwise when the value is not the high value in the step (S27).

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE DRAWINGS

The present invention will be described more in detail hereinafter in conjunction with the accompanying drawings.

Figure 1:
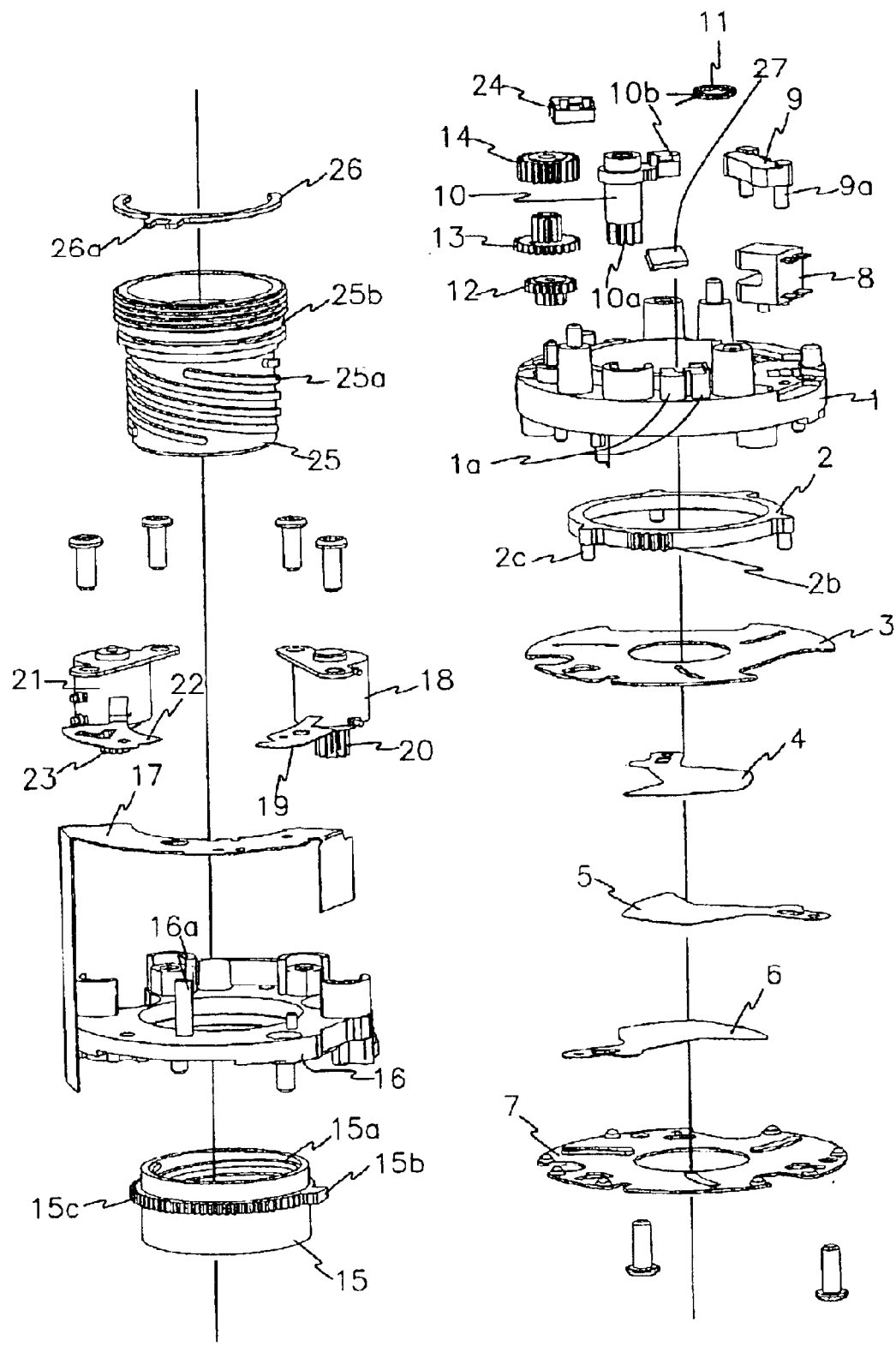
FIG. 1 is an exploded perspective view of an electronic shutter for a camera according to a first embodiment of the present invention.

FIG. 1 shows an electronic shutter according to a first embodiment of the present invention.

The inventive electronic shutter comprises first driving force generating means for setting an initial position and generating driving force for moving a lens barrel 25 when power is turned On and a release signal of a shutter switch is detected; lens barrel moving means for moving the lens barrel 25 in response to a measured distance to a subject by use of driving force from the first driving force generating means, the lens barrel moving means being engaged with the driving force generating means with a predetermined speed reduction ratio; adjusting means for adjusting the lens barrel moving means to an initial position when electric power is applied or a shutter release operation is applied; second driving force generating means for generating driving force for opening and closing sectors 4, 5 and 6 in response to a calculated exposure amount; and sector opening/closing means for opening and closing the sectors 4, 5 and 6 by use of driving force from the second driving force generating means.

Figure 5:
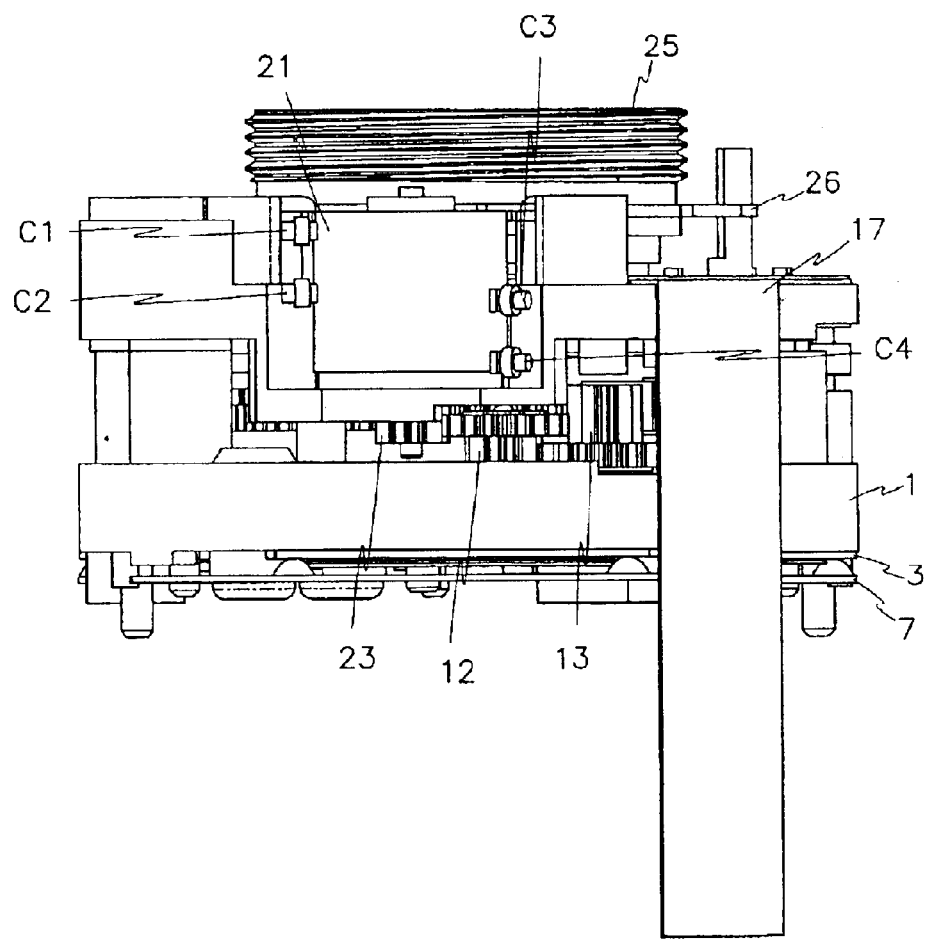
FIG. 5 is a view illustrating a can-type stepping motor according to the first embodiment of the present invention.

The first driving force generating means comprises, as shown in FIG. 5, a stepping motor 21 including a rotor composed of plural permanent magnets, a gear 23 integrally coupled to the rotor, and a pair of stators having plural contact points for receiving step pulses applied to control the rotating direction of the rotor.

Figure 7:
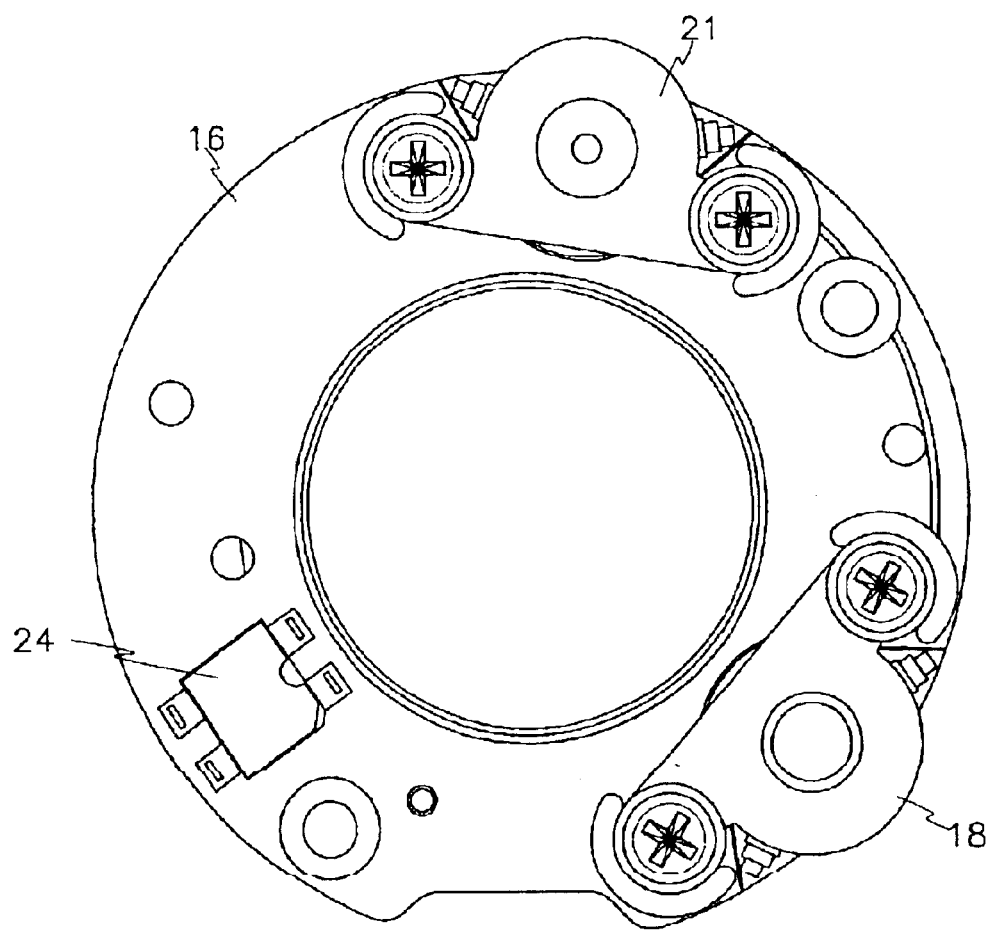
FIG. 7 is view illustrating a mounting state of the stepping motor for an automatic focusing and the automatic exposure motor for exposure on a motor base according to the first embodiment of the present invention.
Figure 8:
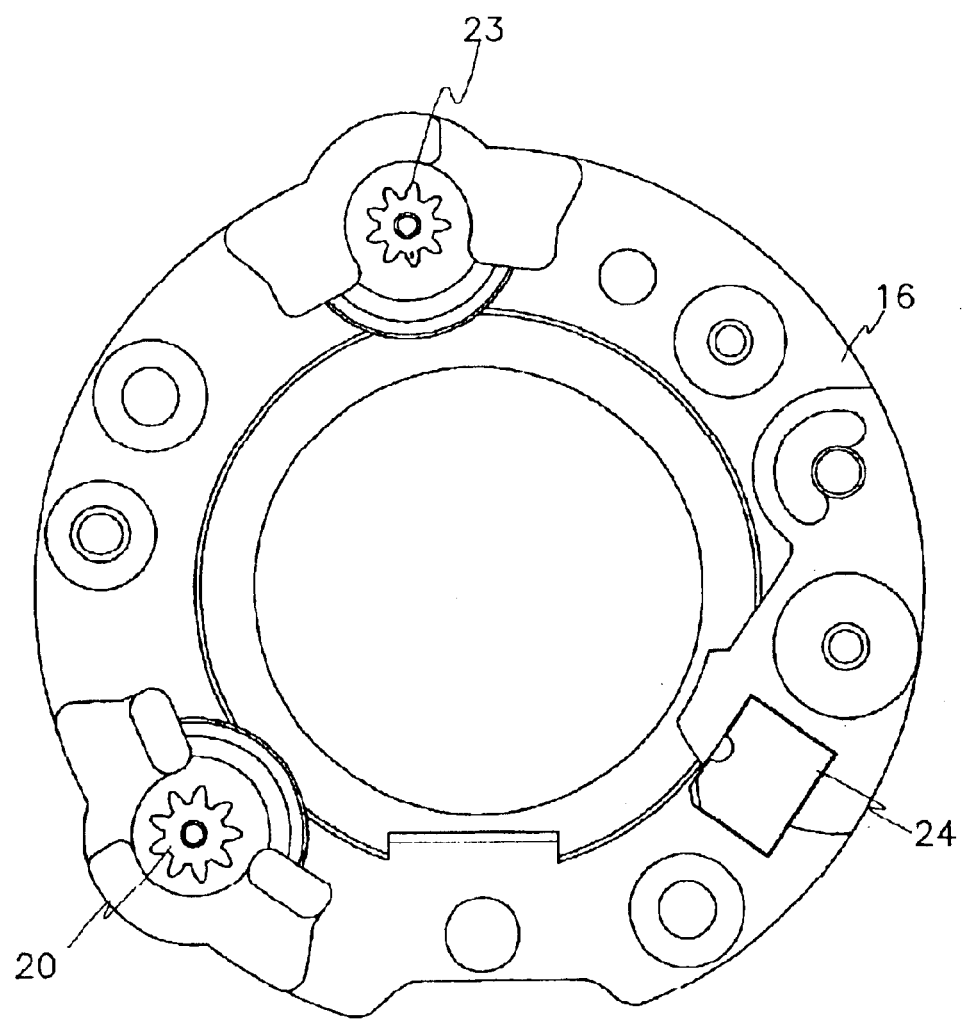
FIG. 8 is rear view of FIG. 7.

The stepping motor 21 is preferably a conventional can-type motor and coupled to a side of a motor base 16 (see FIGS. 1, 7 and 8), facing toward the photographic object. When one pulse is applied to the contact points of the stator, the stepping motor 21 rotates by 45° clockwise or counterclockwise, and when eight (8) pulses are applied, it rotates by 360°.

Figure 2:
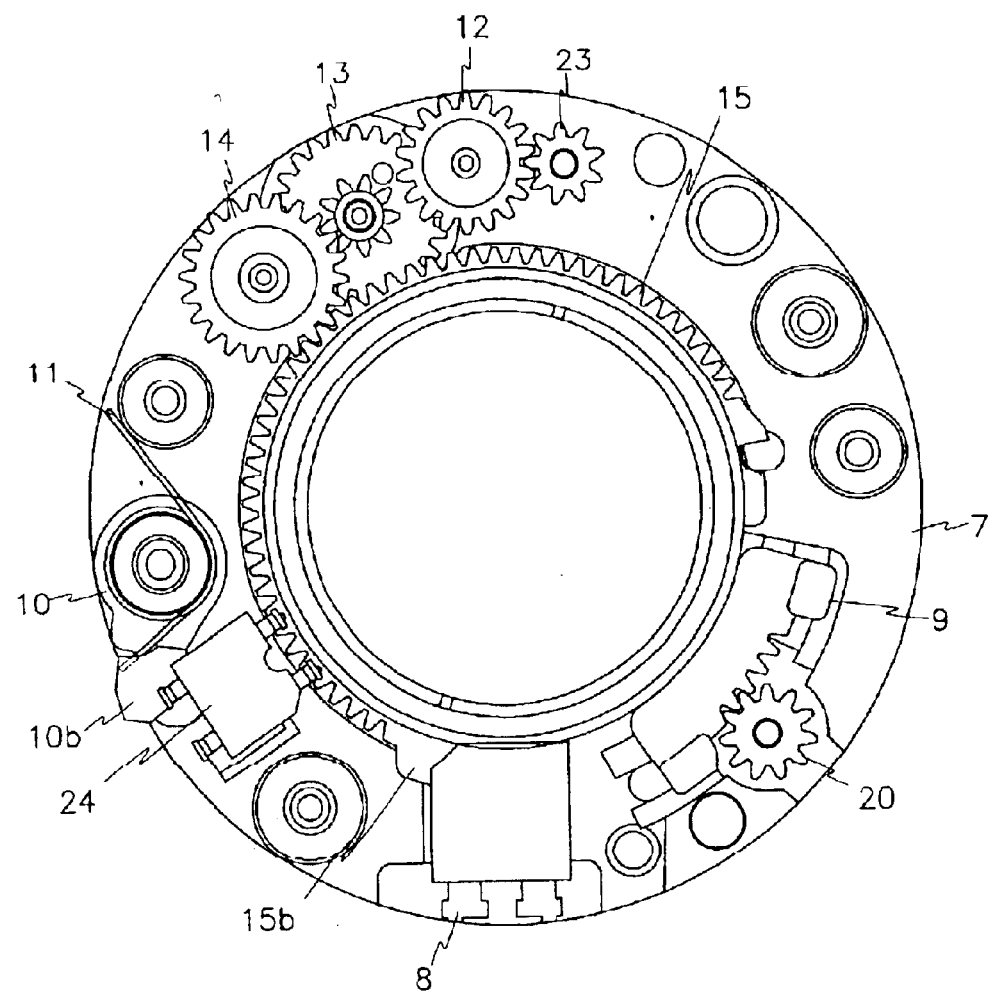
FIG. 2 is view illustrating a power transmission mechanism, coupled to a shutter base, for an automatic focusing operation according to the first embodiment of the present invention.
Figure 3:
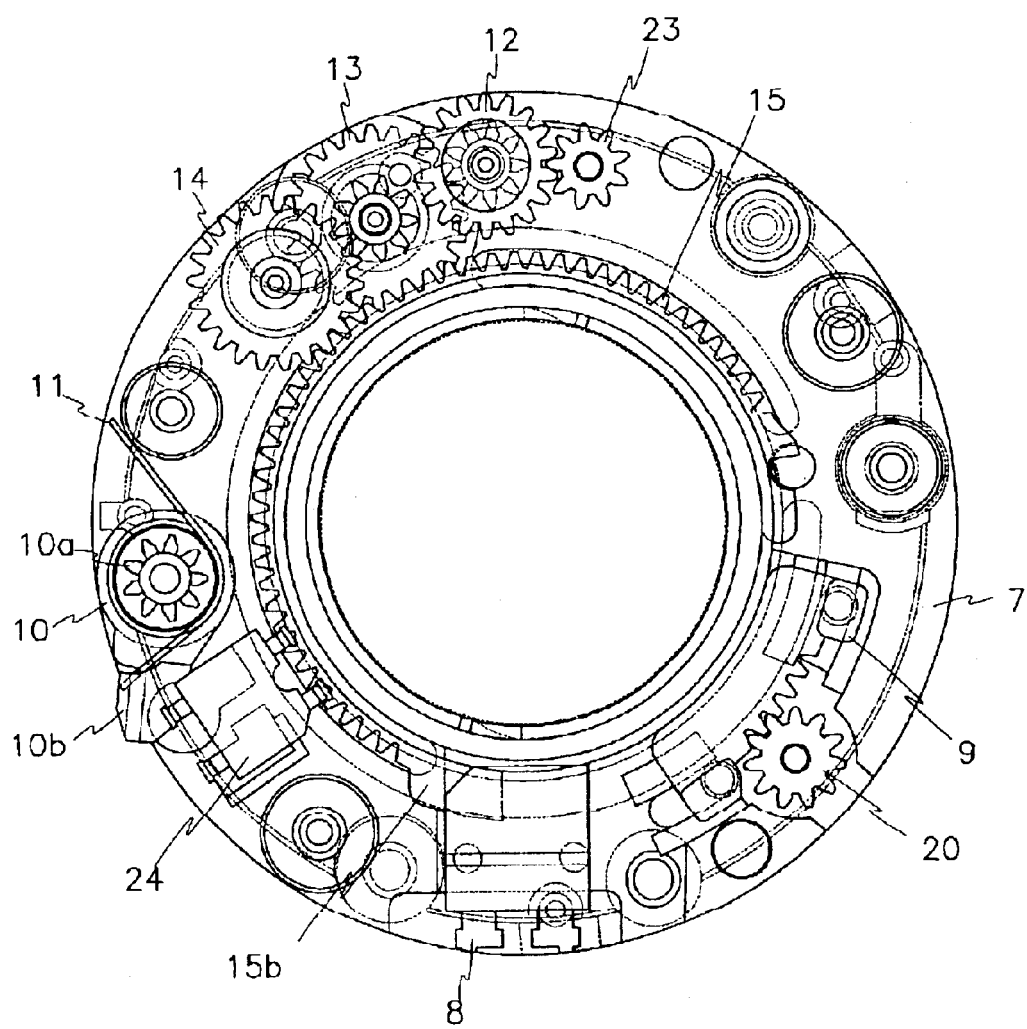
FIG. 3 is view illustrating a shutter base viewed from the object side to explain the power transmission mechanism for an automatic exposure operation according to the first embodiment of the present invention.

As shown in FIGS. 2 and 3, the first driving force generating means further comprises a speed reduction gear mechanism having plural speed reduction gears 12 and 13 and a power transmission gear 14. These gears 12, 13 and 14 are engaged with gear 23 which is in turn coupled to the rotor of the stepping motor, thereby transmitting rotational force of the stepping motor to the lens barrel moving means. That is, the speed reduction gear mechanism has a gear meshing arrangement that is designed to reduce the rotational force of the stepping motor 21 and transmits the reduced rotational force to a focus ring 15 (see FIGS. 1 and 2) of the lens barrel moving means. The speed reduction gear mechanism is installed on the motor base 16 at an opposite side of the motor mounting side.

The lens barrel moving means comprises, as shown in FIGS. 1 and 2, a ring 15 rotatable by the power transmission gear 14 engaged therewith. The focus ring 15 is rotatably disposed on the shutter base 1. The focus ring 15 provides at its outer circumference with a gear portion 15c configured to be engaged with the power transmission gear 14. A signal detection projection 15b is formed extending from a portion of the gear portion 15c. The focus ring 15 includes helicoid grooves 15a at its inner circumference.

Meanwhile, the lens barrel 25 is provided at its outer circumference with helicoid projections 25a fitting in the helicoid grooves 15a of the focus ring 15 so as to linearly move in a direction of an optical axis along the helicoid grooves 15a. That is, the lens barrel 25 is provided at its outer circumference with a groove 25b in which a relay lever 26 is fixedly coupled. The relay lever 26 is provided at its outer circumference with a fork-shaped portion 26a. A hook-shaped projection 16a provided on the motor base 16 is coupled to the fork-shaped portion 26a to be linearly movable. Accordingly, the lens barrel 25 adjusts the focus while linearly moving in the direction of the optical axis in accordance with the rotation of the focus ring 15.

Figure 9:
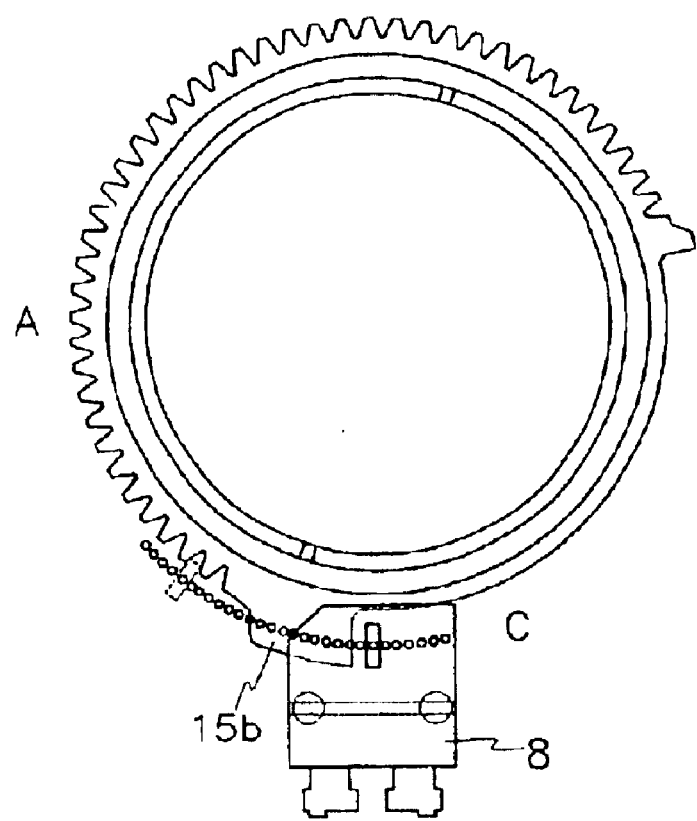
FIG. 9 is a view illustrating a relationship between a focus ring and a photo interrupter according to a preferred embodiment of the present invention.

The adjusting means comprises, as shown in FIGS. 1, 2 and 9, a photo interrupter 8 that detects an initial position of the focus ring by detecting a position of the signal detection projection 15b of the focus ring 15. That is, when a distance to the object and an exposure value are respectively calculated at a distance measuring circuit (not shown) and an exposure measuring circuit (not shown) by the operation of the shutter switch and the shutter starts operating in response to the calculated distance and exposure value or when the power is switched from an off-state to an on-state, the adjusting means detects the current position of the focus ring 15 and, in the case it is determined that the focus ring 15 is not in the initial position, adjusts the focus ring 15 to the initial position.

The photo interrupter 8 has a conventional structure having a light generation part and a light reception part. The light reception part detects the light in accordance with the operation of the focus ring 15, determines whether the focus ring 15 is in the initial position according to the position of the signal detection projection 15b provided on the outer circumference of the focus ring 15, and outputs a signal corresponding to the determined result.

When it is determined that the position of the signal detection projection 15b is deviated from the initial position, a corresponding signal is provided to the stepping motor 21 as a predetermined pulse signal by control means to adjust the focus ring 15 to the initial position by rotating the focus ring 15 clockwise or counterclockwise.

Figure 6:
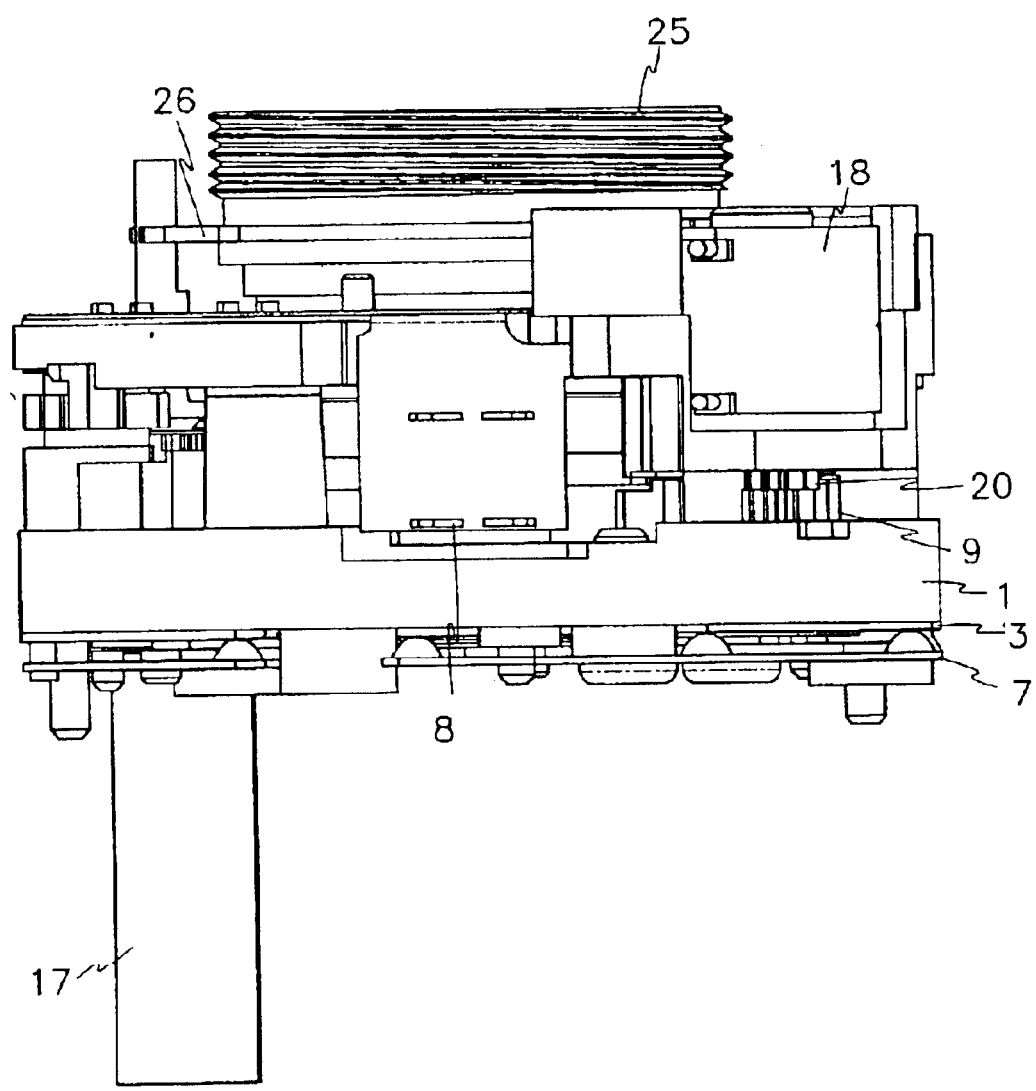
FIG. 6 is a view illustrating a can-type automatic exposure motor according to the first embodiment of the present invention.

The second driving force generating means comprises, as shown in FIGS. 1 and 6, an exposure motor 18 that is basically formed of a can-type stepping motor similar to the stepping motor 21 of the first driving force generating means. The exposure motor 18 is coupled on the motor base 16.

The exposure motor 18 comprises a power transmission gear 20 for transmitting driving force to the sector opening/closing means to open and close the three sectors.

The sector opening/closing means comprises a connection gear 9 being engaged with the gear 20 and an exposure ring 2 rotating in response to the movement of the connection gear 9. The connection gear 9 is coupled to the shutter base in a manner movable within a predetermined range. In addition, the connection gear 9 comprises a projection 9a passing through the shutter base 1 and selectively contacting the exposure ring 2 for rotating the same.

The exposure ring 2 is rotatably disposed on a portion of the shutter base, which is opposite to a portion where the connection gear 9 is disposed. The exposure ring 2 comprises a hook projection 2a formed on its outer circumference to suppress the rotational movement in the circumferential direction, a gear part 2b having plural gears on a portion of its outer circumference, and driving projections 2c for rotating the three sectors 4, 5 and 6 in the direction of the optical axis.

Meanwhile, the sectors 4, 5 and 6 are respectively provided with grooves 4a, 5a and 6a in which the driving projections 2c provided on the exposure ring 2 can be fitted. The sectors 4, 5 and 6 are rotatably coupled to the shutter base 1.

An iris plate 3 for setting the size of an aperture defined by an iris and a sector cover 7 for protecting the sectors 4, 5 and 6 are also coupled on the shutter base 1.

The sector opening/closing means is engaged with the gear portion 2b provided on the exposure ring 2 and further comprises an open lever spring 11 formed of an elastic member and an open lever 10 rotating by the open lever spring 11.

The open lever 10 is rotatably coupled to the shutter base 1 and provided at its one end with a gear portion 10a being engaged with the gear portion 2b of the exposure ring 2. The open lever spring 11 is formed of a twist spring, one end of which is supported on the shutter base 1 and the other end of which is supported by projection 10b of the open lever 10 for biasing the same. That is, the open lever spring 11 biases the exposure ring 2 in a predetermined direction.

The sector opening/closing means is coupled to exposure position detection means for detecting the position of the exposure ring 2 to set an initial point of the automatic exposure adjustment.

The exposure position detection means comprises, as shown in FIGS. 1 and 2, a photo reflector 24 located on the motor base 16 and a reflecting plate 27 located on a projected end 1a of the shutter base 1. The exposure position detection means is designed such that the projection 10b of the open lever 10 rotating in response to the rotation of the exposure ring 2 is located between the reflector 24 and the reflecting plate 27. That is, the photo reflector 24 is designed detecting the initial position by detecting infrared rays reflected on the reflecting plate 27 in accordance with the position of the projection 10b of the open lever 10.

The reference numeral 17 that is not described above is a flexible circuit board for applying a control signal to the stepping motor 21 and the exposure motor 18. The flexible circuit board is coupled to a control unit (not shown). The reference numeral 22 that is not also described is another flexible printed circuit board coupled to the stepping motor 21.

Figure 10:
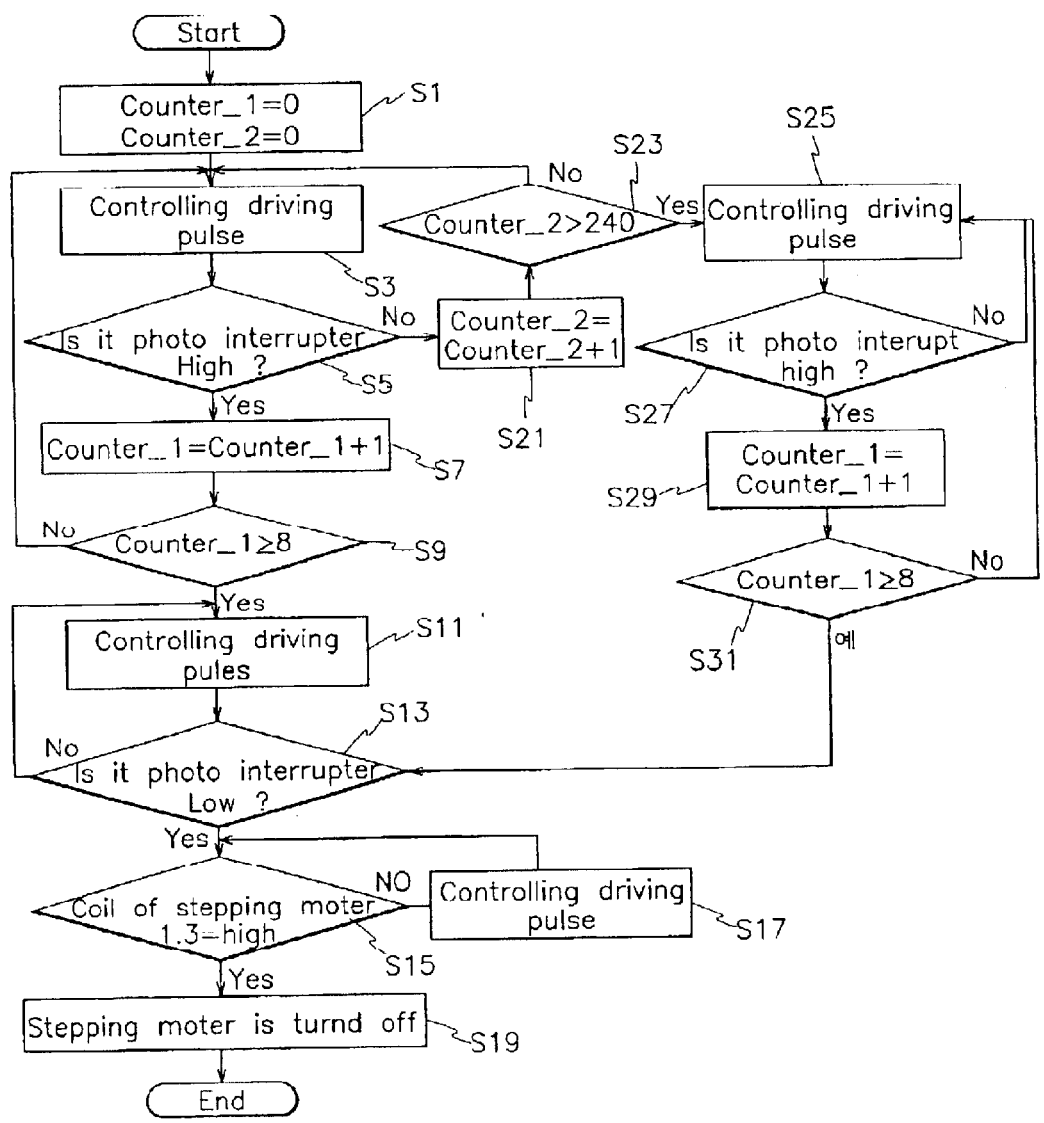
FIG. 10 is a flowchart illustrating an initial position setting method according to a preferred embodiment of the present invention.

The operation of the above-described electronic shutter will be described hereinafter in conjunction with the accompanying drawing FIGS. 9 and 10.

First, when the electric power of the camera is turned to an on-state or the driving state of the shutter is detected, the control means (not shown) performs an initial position setting of the focus ring 15 through the first driving force generating means.

As shown in FIG. 5, when the control means drives the rotor by outputting "high" or "low" control signal to coils c1, c2, c3 and c4 of the stepping motor 21, the gear 23 rotates together with the rotor. The gear 23 is speed-reduced through the reduction gears 12 and 13 and the power transmission gear 15c. Therefore, the focus ring 15 of the lens barrel moving means rotates in a direction identical to that of the stepping motor 21.

At this point, the control means clears counter_1 or counter_2 value detected by the interrupter 8 to a value "0" (S1). In addition, the control means controls the driving pulse signal such that focus ring 15 rotates counterclockwise by driving the stepping motor 21 (S3), during which it is determined if the detected value of the photo interrupter 8 is in a high value H (S5). This is a state where the signal detection projector 15b is located on the photo interrupter 8 as shown in FIG. 9.

At this point, when the value detected by the photo interrupter 8 is the high value H, the light of the light generating part is interrupted by the signal detection projector 15b of the focus ring 15 without reaching the light reception part. When the value detected by the photo interrupter 24 is in the low value L, the light from the light generating part is not interrupted by the signal detecting projector 15b to reach the light reception part.

When the value detected by the photo interrupter 8 is the high value H, the value of couter_1 is increased by 1 (S7), and the control means determines if the increase value of counter_1 is consecutively detected above predetermined times (e.g., above 8 times) (S9). When the increase value of counter_1 is not consecutively detected above the predetermined times, the control procedure is returned to Step S3 where the focus ring 15 is controlled to rotate counterclockwise so that the value of the counter_1 is repeatedly increased as many as the predetermined times.

When the value of the counter_1 reaches the predetermined times, the pulse is controlled such that the focus ring 15 rotates clockwise (S11). Then the control means determines if the value detected by the photo interrupter is a low value (S13). When the determined value is not the low value L, Step S11 where the focus ring 15 is driven clockwise is repeatedly performed, and when the determined value is the lower state L, it is determined if the values applied to the first and third coils of the stepping motor 21 are the high value H (S15). When the value is not the high value H, the pulse is controlled such that the focus ring 15 rotates clockwise (S17), and Step S15 is again performed. When the condition is satisfied in Step S15, the power of the stepping motor 21 is turned Off (S19), and the control procedure is finished.

In Step S5, when the valve detected by the photo interrupter 8 is not the high value H, a value of a counter_2 is increased by 1 (S21). Then, the control means determines if the value of the counter_2 is above a predetermined value (e.g., 240 times) (S23). When the value of the counter_2 is less than the predetermined value (e.g., 240 times), Step S3 where the focus ring 15 is driven counterclockwise is performed. At this point, when a portion C in FIG. 9 is located on the photo interrupter 8, Steps after Step S5 are performed.

When the condition is satisfied In Step S23 (when a portion A is located on the photo interrupter), the focus ring 15 is controlled to rotate clockwise (S25). The control means detects if the value detected by the photo interrupter 8 is the high value H (S27). When the value is not the high value H, the control means keeps driving the focus ring 15 clockwise (S25), and when the value is the high value H, the value of the counter_1 is added by 1 (S29). Then, it is determined if the value of the counter_1 is above a predetermined value (e.g., 8 times) (S31). When this condition is not satisfied, the control procedure is returned to Step S25, and when satisfied, the control procedure is returned to Step S13 to determine if the value detected by the interrupter 8 is the low value L. Next steps are identical to the steps above-described.

Initial focusing position is determined by the movement of the lens barrel which is operably coupled to the focus ring by helicoids, in the direction of the optical axis according to the initial position setting of the focus ring 15. That is, the initial position of the lens barrel for adjusting the focus is set on a middle stage in the whole range of the automatic focusing adjustment position (see the initial position of FIG. 22).

In a state where the initial position for the focusing operation is set as described above, the control means detects operation of the release switch. When the operation of the release switch is detected, the focus ring 15 is moved to conduct the automatic focusing operation in response to the measured distance to the object, which is calculated by the distance measuring circuit. That is, the control means applies driving pulses to the coils c1, c2, c3 and c4 of the stepping motor 21 to drive the focus ring 15 clockwise or counterclockwise. Therefore, the lens barrel 25 moves between maximum and minimum advancing positions in the direction of the optical axis, thereby realizing the focusing operation. Since the movement of the lens barrel 25 is described in the above, the detailed description thereof will be omitted herein.

After the focusing adjustment is completed with respect to the object as is described above, the control means then drives the exposure motor 18. The sector opening/closing procedure will be described more in detail with reference to FIGS. 1, 4, 11 and 12.

When driving pulses are applied to the exposure motor 18, the gear 20 coupled to the rotor rotates to move the connecting gear 9 which is engaged with the gear 20. In addition, the projection 9a of the connection gear 9 rotates the hook projection 2a of the exposure ring 2 clockwise, thereby closing the sectors (see FIG. 4).

Figure 4:
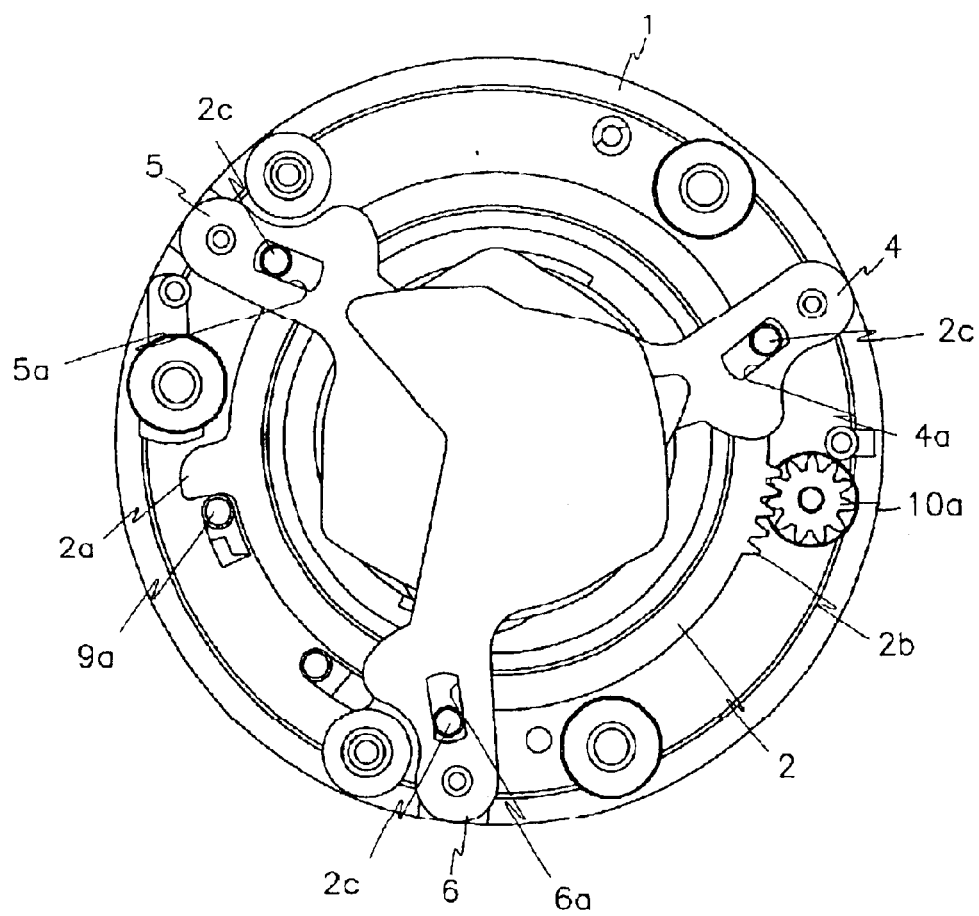
FIG. 4 is view illustrating the operation of a sector according to the first embodiment of the present invention.

Furthermore, since the gear part 2b of the exposure ring 2 is engaged with the gear portion 10a of the open lever 10, the open lever 10 rotates counterclockwise in FIG. 4 (clockwise in FIGS. 2 and 3) in response to the rotation of the exposure ring 2. Accordingly, the open lever 10 activates the open lever spring 11 as shown in FIG. 2. That is, the open lever spring 11 biases the open lever 10 counterclockwise in FIG. 2, thereby maintaining the closing state of the sectors 4, 5 and 6 by magnetic force of the exposure motor 18. In this state, when the exposure motor 18 is controlled to open the sectors 4, 5 and 6, the gear 20 rotates counterclockwise in FIG. 2, and the connection gear 9 being engaged with the gear 20 rotates clockwise in FIG. 2 (counterclockwise in FIG. 4).

By the above operation, as shown in FIG. 4, the projection 9a of the connection gear 9 releases the locking state of the hooking projection 2a of the exposure ring 2. As a result, the exposure ring 2 rotates counterclockwise in FIG. 4 by the biasing force of the open lever spring 11 and moves in a state where the driving projection 2c of the exposure ring 2 is fitted in the grooves 4a, 5a and 6a provided on the sectors 4, 5 and 6, thereby realizing the exposure by opening the sectors 4, 5 and 6. After a lapse of a predetermined time, the exposure motor 18 is controlled to rotate in a reverse direction; the sectors 4, 5 and 6 are closed, thereby completing the exposure operation.

Figure 11:
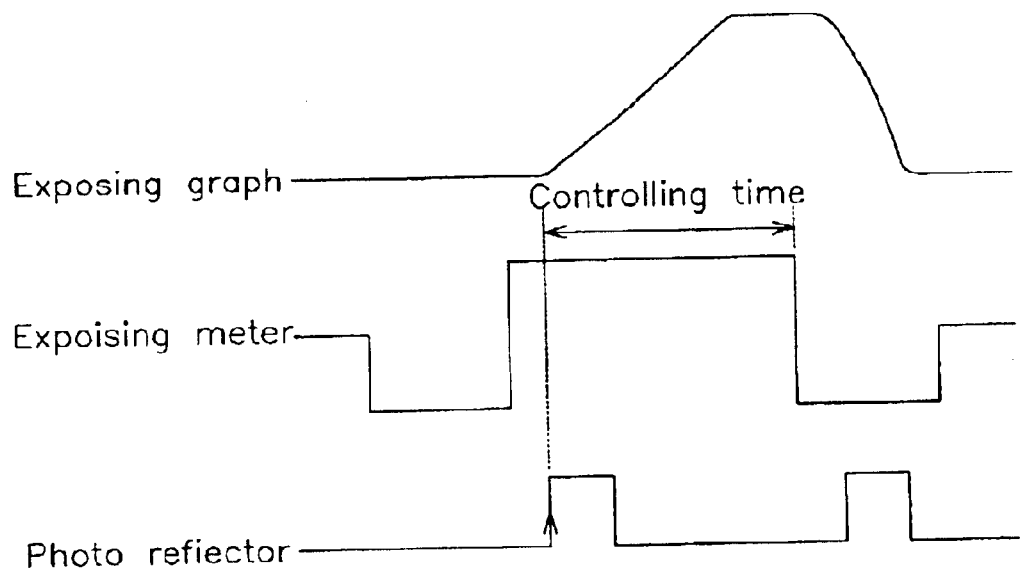
FIG. 11 is a timing diagram illustrating an exposure time control according to a preferred embodiment of the present invention.
Figure 12:
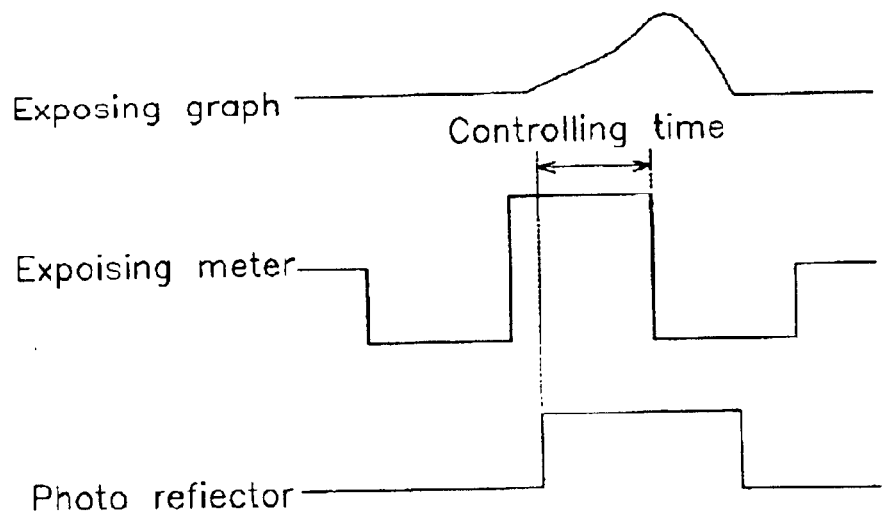
FIG. 12 is a timing diagram illustrating an exposure time control according to a preferred embodiment of the present invention.

During the above described exposure operation, the detection of the initial exposure position is realized by the photo reflector 24 detecting the infra rays reflected on the reflecting plate 27. FIG. 11 shows a case where the exposure time is relatively long, and FIG. 12 shows a case where the exposure time is relatively short.

In addition, in the course of passing of the projection 10b of the open lever 10 between the photo reflector 24 and the reflecting plate 27, a proper exposure can be controlled by controlling a time (t1) from a point where the high value signal is detected to a point where the exposure motor 18 is reversed. FIG. 11 shows a case where the exposure time is relatively long, and FIG. 12 shows a case where the exposure time is relatively short.

Figure 13:
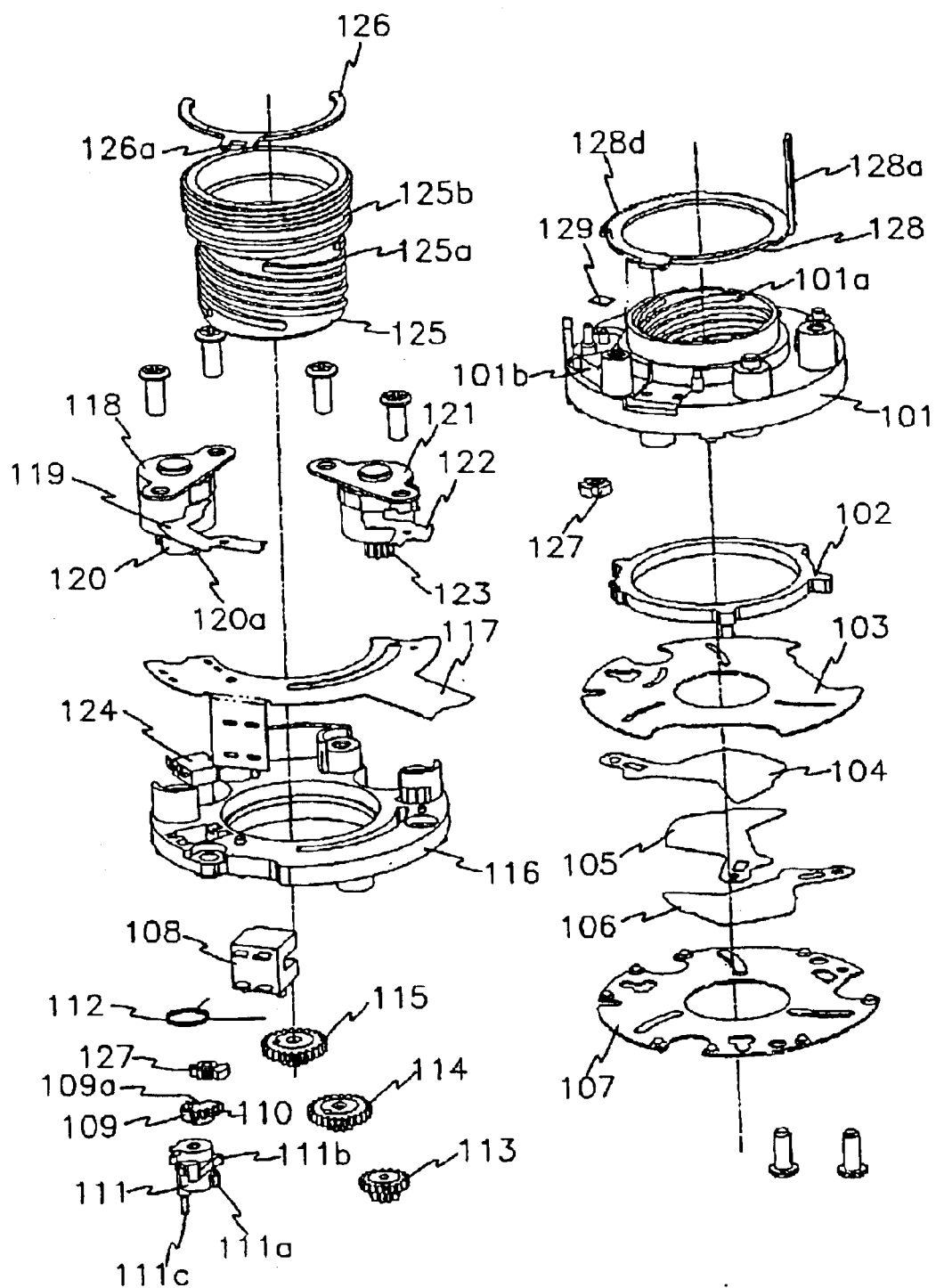
FIG. 13 is an exploded perspective view illustrating an electronic shutter according to a second embodiment of the present invention.

FIG. 13 shows an electronic shutter according to a second embodiment of the present invention.

The electronic shutter of this embodiment comprises first driving force generating means for setting an initial position and generating driving force for moving a lens barrel 125 when power is turned On and a release signal of a shutter switch is detected; lens barrel moving means for moving the lens barrel 125 in response to a measured distance to an object by use of driving force from the first driving force generating means, the lens barrel moving means being engaged with the driving force generating means with a predetermined speed reduction ratio; adjusting means for adjusting the lens barrel moving means to an initial position when electric power is applied or a shutter release operation is applied; second driving force generating means for generating driving force for opening and closing sectors 104, 105 and 106 in response to a calculated amount of exposure; and sector opening/closing means for opening and closing the sectors 104, 105 and 106 by use of driving force from the second driving force generating means.

The electronic shutter of this embodiment further comprises sector opening prevention means for preventing the sectors from opening by inadvertent outer shocks in a power-off state and a shutter stand-by state.

Figure 18:
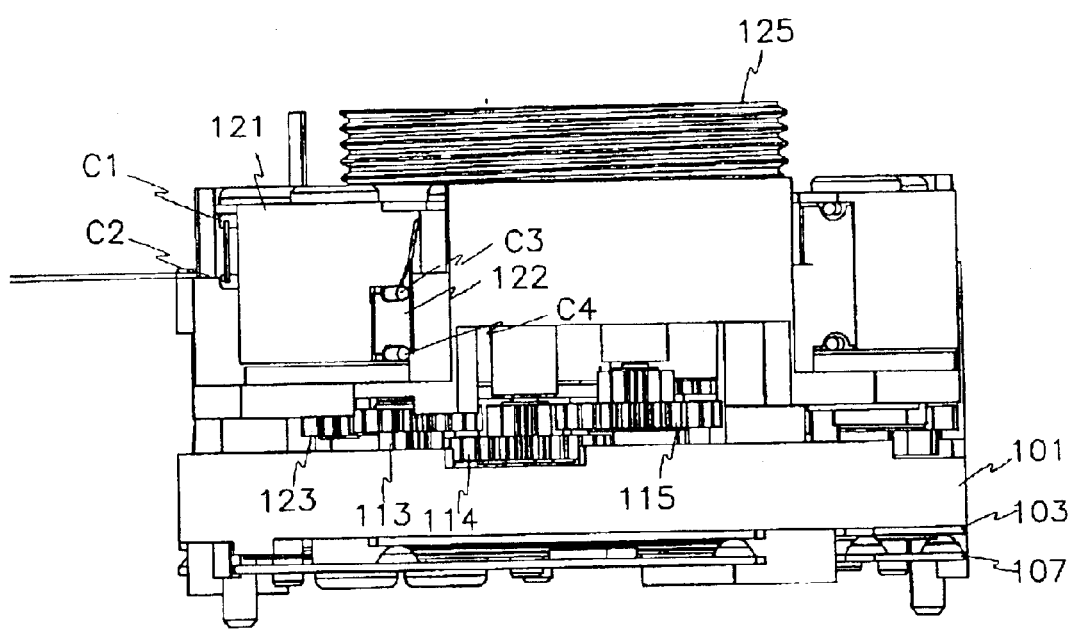
FIG. 18 is a view illustrating a power transmission mechanism of a stepping motor for an automatic focusing operation according to the second embodiment of the present invention.

The first driving force generating means comprises, as shown in FIGS. 13 and 18, a stepping motor 121 including a rotor composed of plural permanent magnets, a gear 123 integrally coupled to the rotor, and a pair of stators having plural contact points for receiving step pulses applied to control the operation of the rotor.

Figure 20:
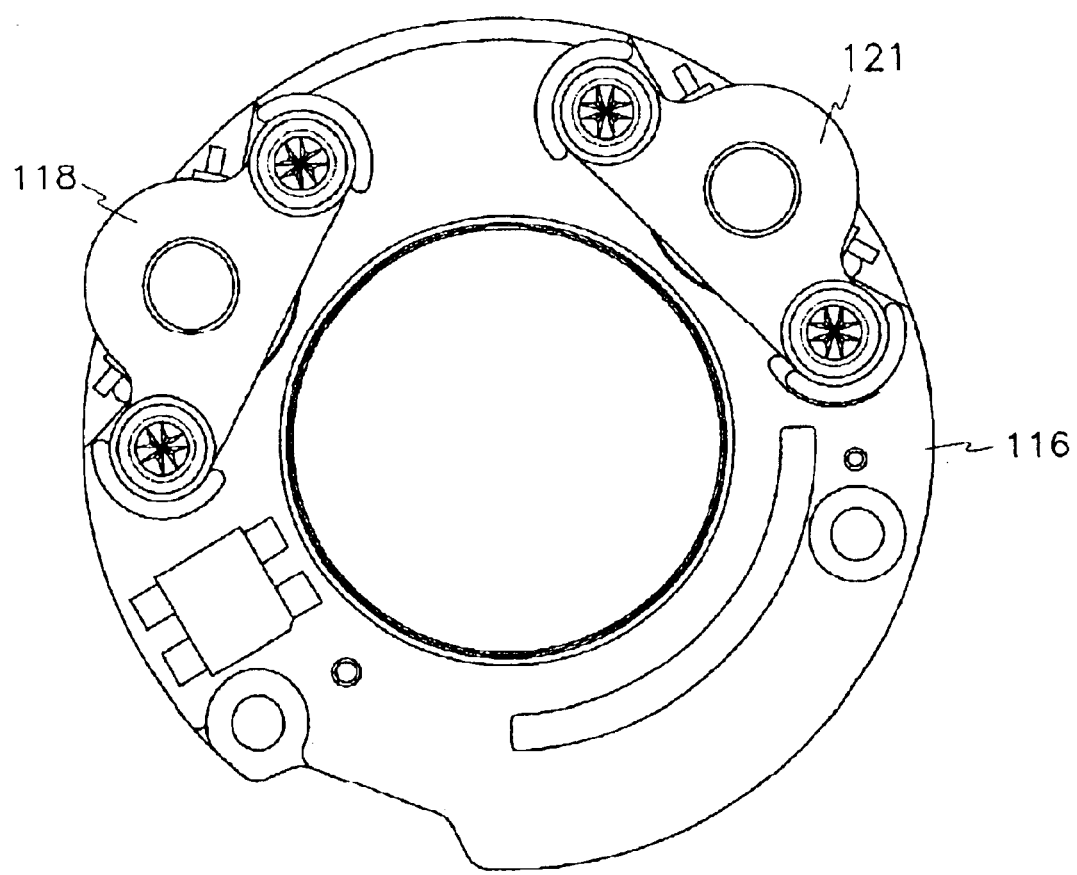
FIG. 20 is a view illustrating a coupled state of the stepping motor for an automatic focusing and an automatic exposure motor for exposure on a motor base.
Figure 21:
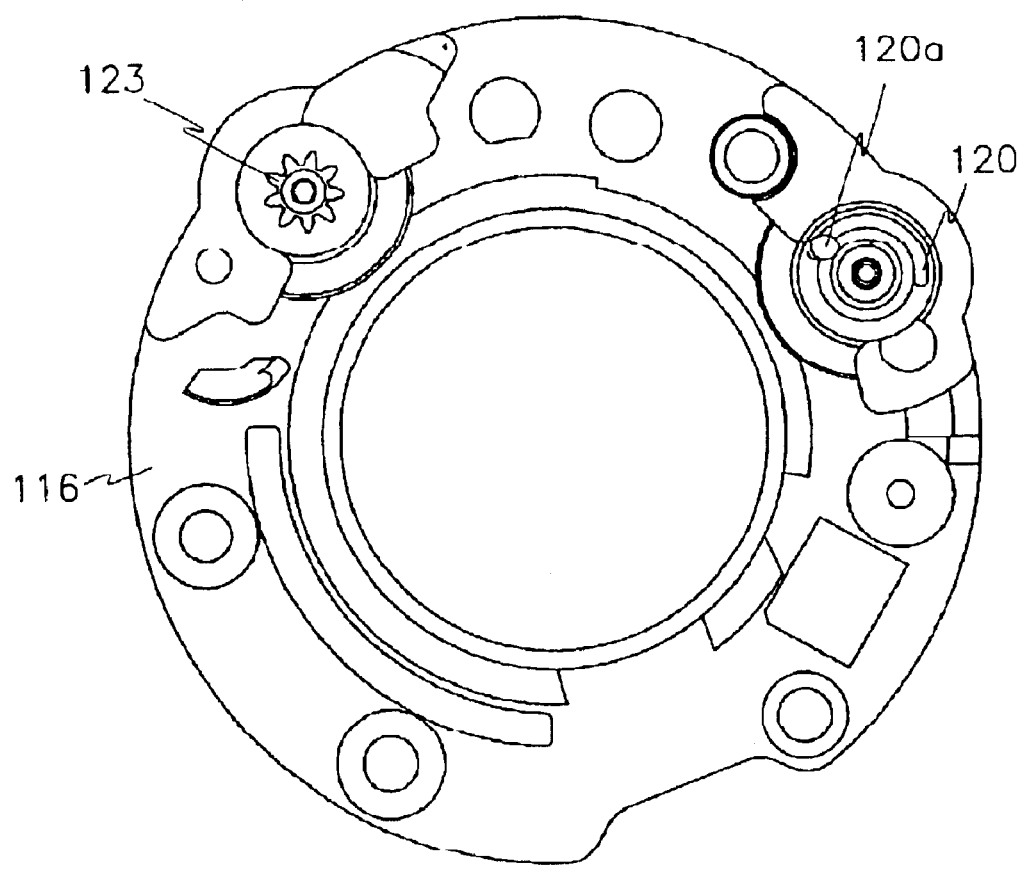
FIG. 21 is a rear view of FIG. 20.

The stepping motor 121 is preferably a conventional can-type motor and coupled to a side of a motor base 116 (see FIGS. 13, 20 and 21), facing toward the photographic subject. When one pulse is applied to the contact points of the stator, the stepping motor 121 rotates by 45° clockwise or counterclockwise, and when eight pulses are applied, it rotates by 360°.

Figure 14:
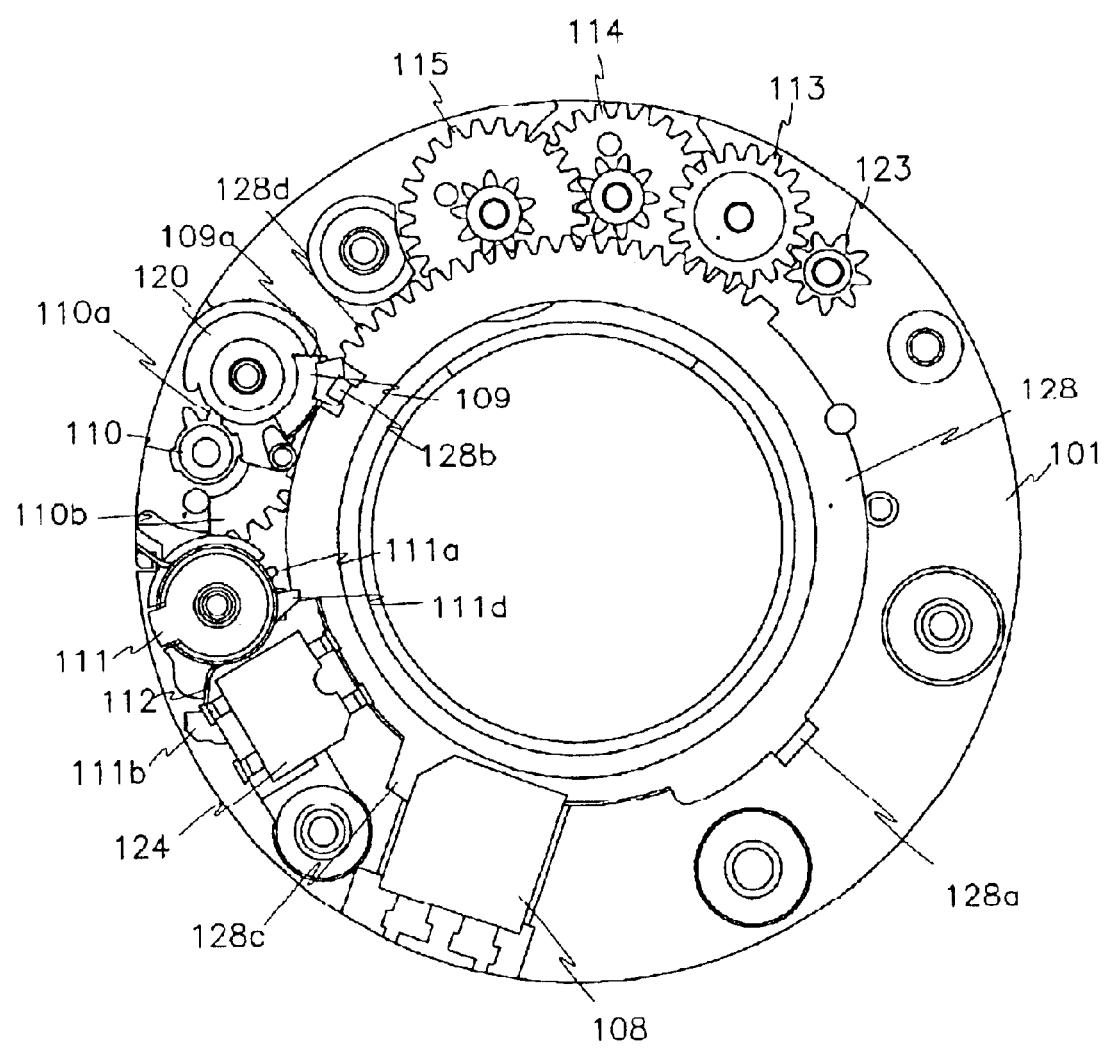
FIG. 14 is a view illustrating a power transmission mechanism for an automatic focusing operation according to the second embodiment of the present invention.
Figure 15:
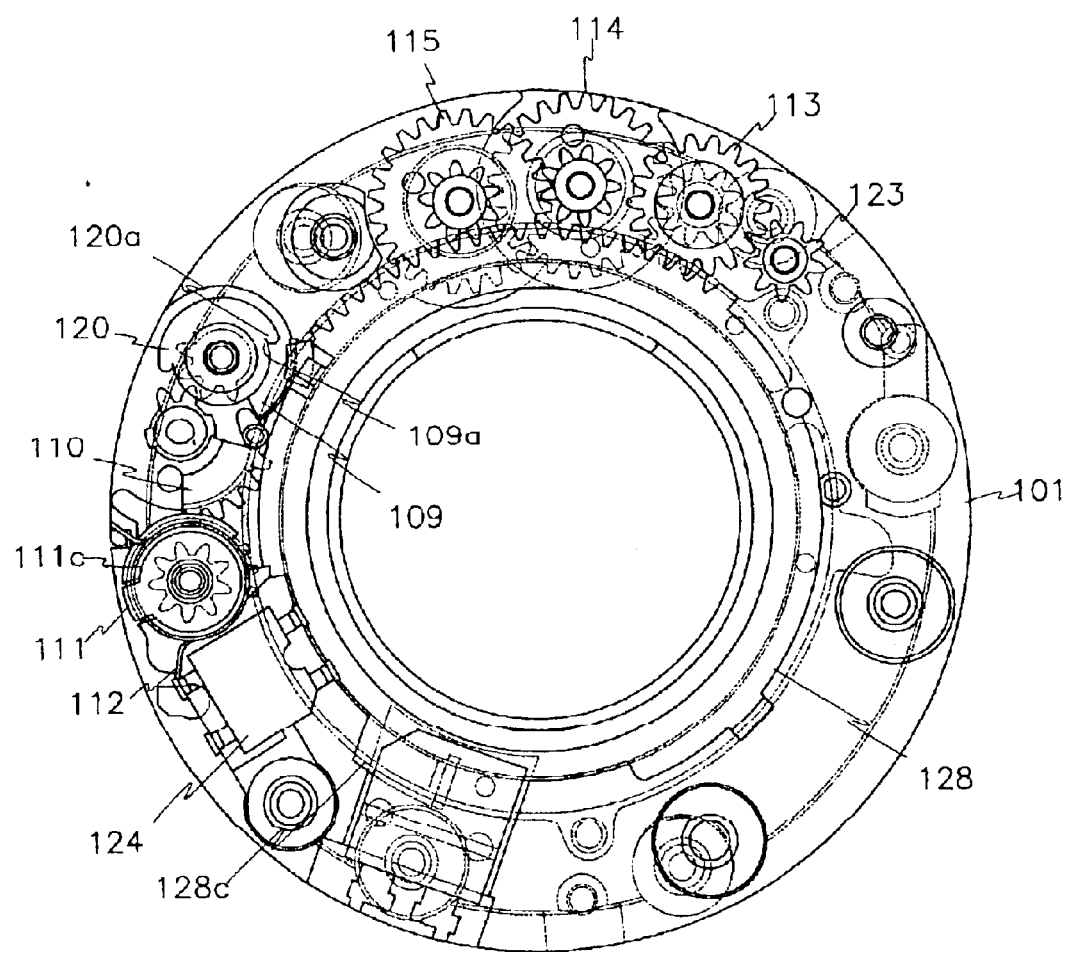
FIG. 15 is a view illustrating a power transmission mechanism for an automatic exposure motor according to the second embodiment of the present invention.

As shown in FIGS. 14 and 15, the first driving force generating means further comprises a speed reduction gear mechanism having plural speed reduction gears 113 and 114 and 115. These gears are engaged with gear 123 which is in turn coupled to the rotor of the stepping motor, thereby transmitting rotation force of the stepping motor 121 to the lens barrel moving means. That is, the speed reduction gear mechanism has a gear meshing arrangement that is designed to reduce the rotational speed of the stepping motor 121 and transmit the reduced rotational speed to a focus ring 128 (see FIGS. 13 and 14) of the lens barrel moving means. The speed reduction gear mechanism is installed on the motor base 116 at an opposite side of the motor mounting side.

The lens barrel moving means comprises, as shown in FIGS. 13 and 14, a ring 128 rotatable by the reduction gear 115 engaged therewith. The focus ring 128 is rotatably disposed on the shutter base 101. The focus ring 128 is provided at its outer circumference with a gear portion 128*d* configured to be engaged with the reduction gear 115. A signal detection projection 128*c* is formed extending from a portion of the gear portion 128*d*. The focus ring 128 includes at its inner circumference a projection 128*a* extending in the direction of the optical axis.

As the sector opening prevention means, the focus ring 128 is provided with a hook step 128*b*.

Meanwhile, the shutter base 101 is provided at its central portion with a penetrating hole defining a light path and helicoid grooves 101*a* formed on an inner circumference of the penetrating hole.

In addition, the lens barrel 125 is provided at its outer circumference with a helicoid projections 125*a* fitted in the helicoid grooves 101*a* of the shutter base 101 so as to linearly move in a direction of an optical axis along the helicoid grooves 101*a*. That is, the lens barrel 125 is provided at its outer circumference with a groove 125*b* in which a relay lever 126 is fixedly coupled. The relay lever 126 is provided at its outer circumference with a fork-shaped portion 126*a*. A hook-shaped projection 128*a* provided on the focus ring 128*a* is coupled to the fork-shaped portion 126*a* to be rotatable together with the rotation of the focus ring 128*a*.

In the first embodiment, the lens barrel is designed to perform only the linear motion, but here in the second embodiment, the lens barrel 125 is designed to perform the rotational motion as well as the linear motion. Accordingly, the focus is adjusted as the lens barrel 125 rotates and reciprocates in the direction of the optical axis in response to the rotation of the focus ring 128.

The adjusting means comprises, as shown in FIGS. 13 and 14, a photo interrupter 108 that detects an initial position of the focus ring 128 by detecting a position of the signal detection projection 128*c* of the focus ring 128. That is, when a distance to the subject and an exposure value are respectively calculated at a distance measuring circuit (not shown) and an exposure measuring circuit (not shown) by the operation of the shutter switch and the shutter starts operating in response to the calculated distance and exposure value or when the power is switched from an off-state to an on-state, the adjusting means detects the current position of the focus ring 128 and, in the case it is determined that the focus ring 128 is not in the initial position, adjust the focus ring 128 to the initial position.

The photo interrupter 108 has a conventional structure having a light emitting part and a light reception part. The light reception part detects the light in accordance with the operation of the focus ring 128, determines whether the focus ring 128 is in the initial position according to the position of the signal detection projection 128*c* provided on the outer circumference of the focus ring 128, and outputs a signal corresponding to the determined result.

When it is determined that the position of the signal detection projection 128*c* is deviated from the initial position, a corresponding signal is provided to the stepping motor 121 as a predetermined pulse signal by control means to adjust the focus ring 128 to the initial position by rotating the focus ring 128 clockwise or counterclockwise.

Figure 19:
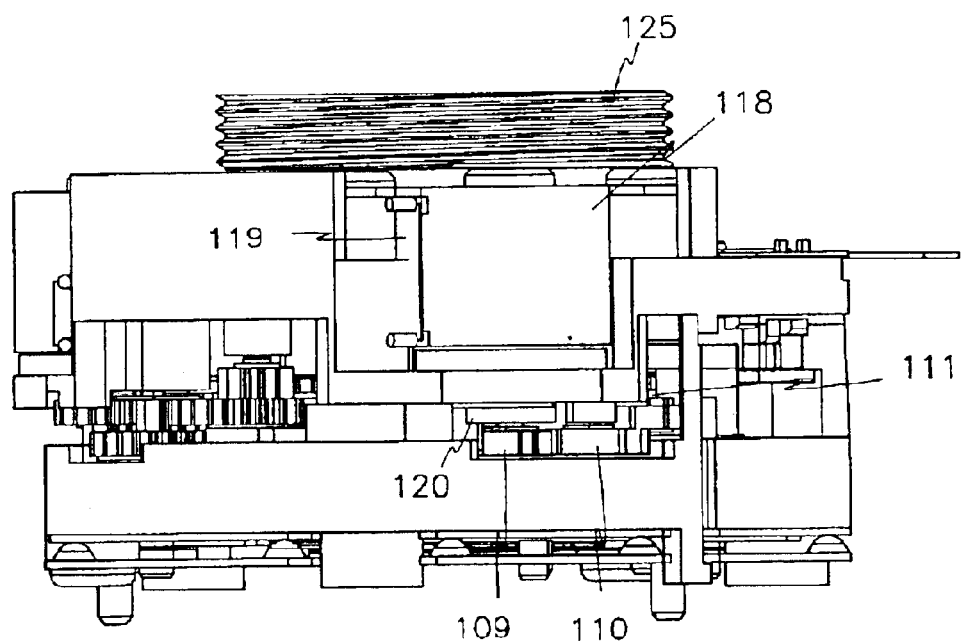
FIG. 19 is a view illustrating a power transmission mechanism of an automatic exposure motor for exposure according to the second embodiment of the present invention.

The second driving force generating means comprises, as shown in FIGS. 13 and 19, an exposure motor 118 that is basically formed of a can-type stepping motor similar to the stepping motor 121 of the first driving force generating means. The exposure motor 118 is coupled on the motor base 116.

The exposure motor 118 comprises a lever 120 that is coupled to the rotor and rotates to open and close the three sectors by transmitting driving force to the sector opening/closing means.

As shown in FIGS. 13–17, the sector opening/closing means comprises a first open gear 109 rotatably surface-contacting the projection 120*a,* a second open gear 110 rotating in response to the rotation of the first open gear 109, an open lever 111 being engaged with the second open gear 110 to rotate in association with the second open gear 110, an open lever gear 127 rotating by receiving rotational force of the open lever 111, and an exposure ring 102 rotating in response to the rotation of the open lever gear 127.

The first open gear 109 includes at a portion of its outer circumference a gear portion 109*a* and is projected at a portion of its outer circumference to surface-contact the projection 120*a* of the lever 120.

The second open gear 110 includes at a portion of its outer circumference a gear portion 110*a* being engaged with the gear portion of the first open gear 109 to receive the rotational force. The second open gear 110 further includes a gear portion 110*b* for transmitting the rotational force from the first open gear 109 to the open lever 111.

The open lever 111 includes a gear portion 111*a* for receiving the rotational force through the gear portion 110*b* of the second open gear 110 and a projection 111*b* extending from a side of its outer circumference. The projection 111*b* is provided to detect the position of the exposure ring 102 while moving between the photo reflector 124 and the reflecting plate 129 (to be described below).

Figure 17:
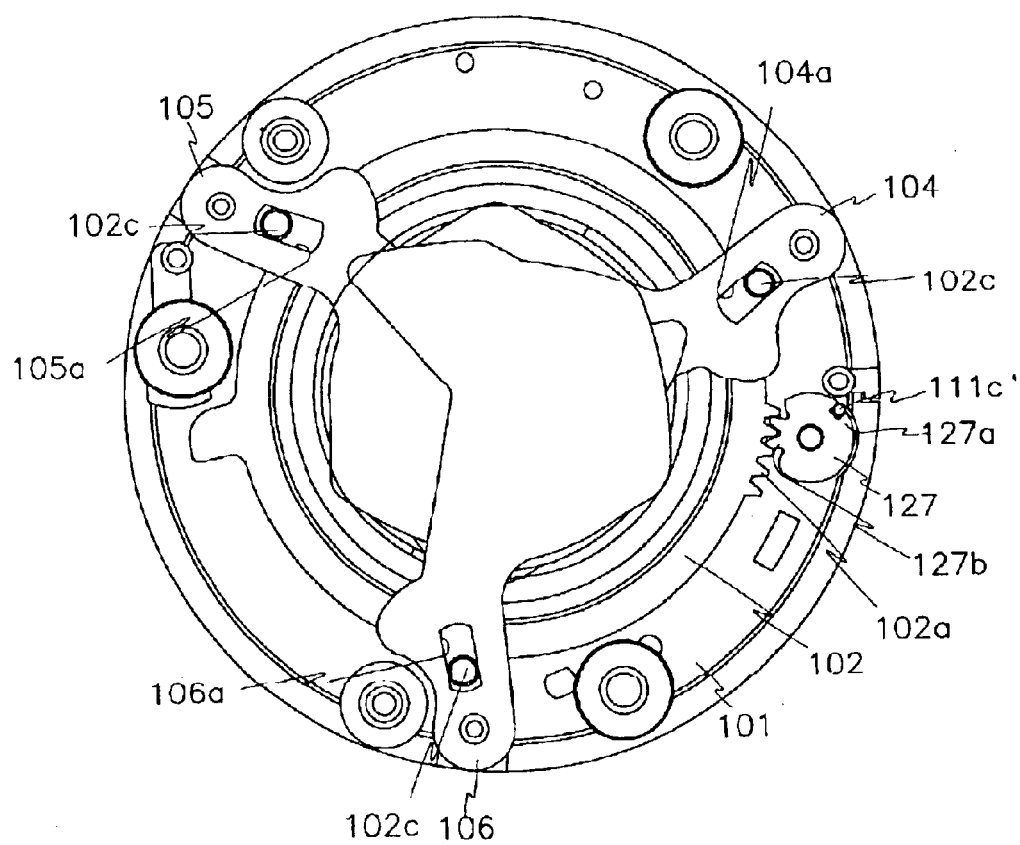
FIG. 17 is a view illustrating an operation and a coupling mechanism of sectors according to the second embodiment of the present invention.

The open lever 111 is provided at its eccentric portion toward the direction of the optical axis with a projection 111*c* that is rotatably fitted in the open lever gear 127 (FIG. 17).

Figure 16:
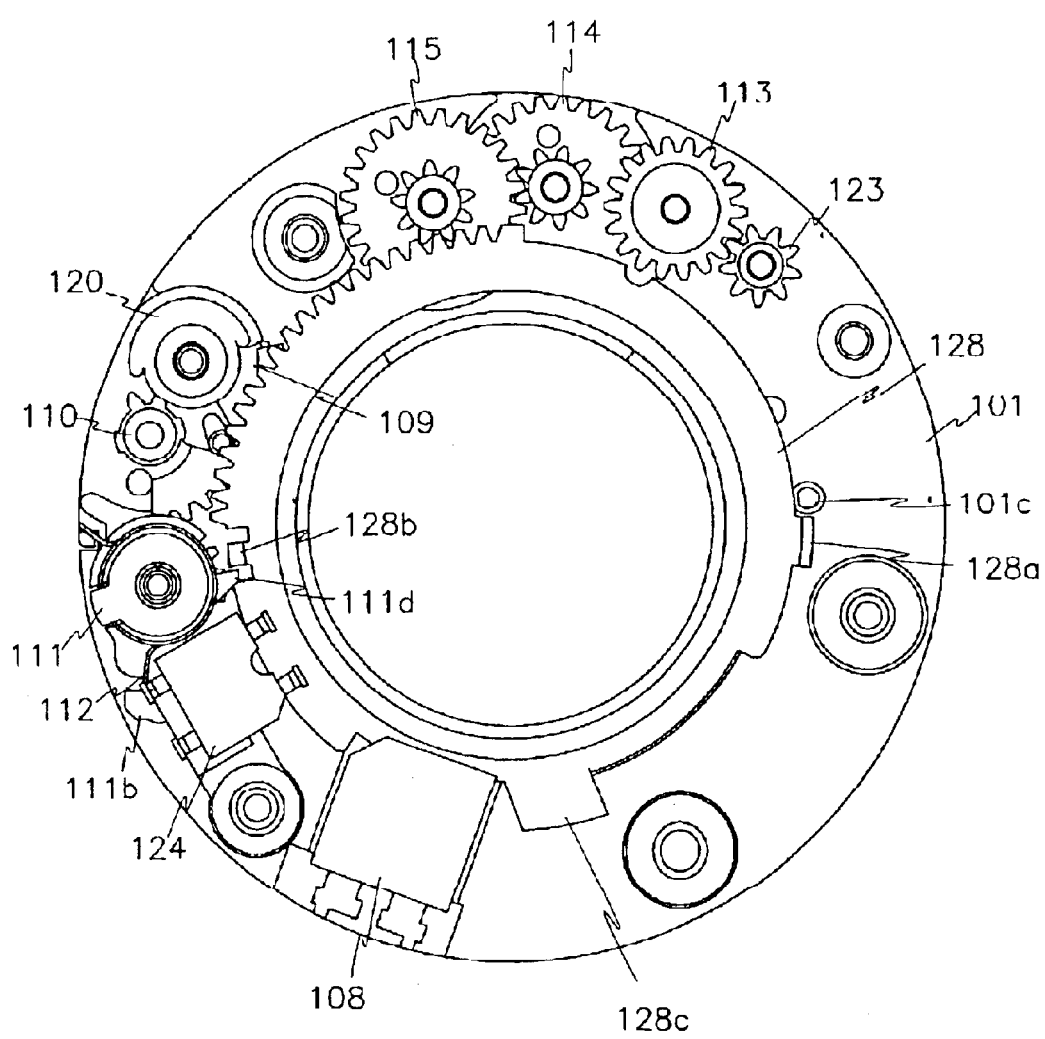
FIG. 16 is a view illustrating a position of an automatic focus ring when a main switch is in an off-state according to the second embodiment of the present invention.
Figure 22:
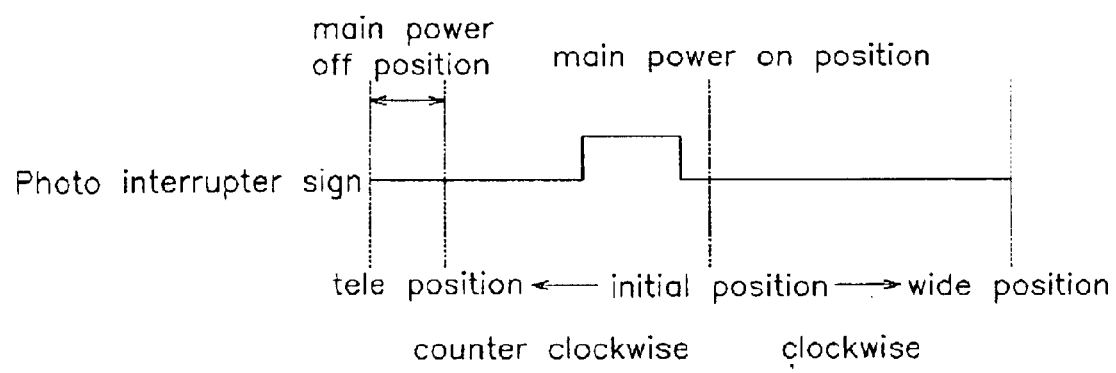
FIG. 22 is a timing diagram illustrating an initial position setting method of a shutter according to a preferred embodiment of the present invention.

In addition, the open lever 111 is, as shown in FIGS. 16 and 22, provided with a suppressing end 111*d* for preventing the sectors 104, 105 and 106 from opening in a main power-off state by being interlocked with the hook step of the focus ring 128.

Meanwhile, the open lever gear 127 receiving the rotational force by the projection 111*c* of the open lever 111 is, as shown in FIG. 17, provided with a hole 127*a* in which the projection 111*c* is fitted and a gear portion 127*b* for transmitting rotational force to the exposure ring 102.

Furthermore, the exposure ring 102 includes a gear portion 102*a* rotating by rotational force transmitted from the gear portion 127b of the open lever gear 127. The exposure ring 102 is rotatably disposed on the shutter base at an opposite surface of a surface where the open lever gear 127 is disposed. The exposure ring 102 has plural driving projections 102c for rotating the sectors 104, 105 and 106.

The sectors 104, 105 and 106 includes grooves 104a, 105a, 106a in which the driving projections 102c of the exposure ring 102 are fitted, respectively. The sectors 104, 105 and 106 are rotatably coupled on the shutter base 101.

An iris plate 103 for setting the size of an aperture defined by an iris and a sector cover 107 for protecting the sectors 104, 105 and 106 are also coupled on the shutter base 101.

The sector opening/closing means comprises an open lever spring 112 elastically supporting the open lever, the open lever spring being formed of an elastic member.

The open lever spring 112 is formed of a twist spring, one end of which is supported on the shutter base 101 and the other end of which is supported by the projection 111b of the open lever 111 for biasing the same. That is, the open lever spring 112 biases the exposure ring 102 in a predetermined direction.

The sector opening/closing means is coupled to exposure position detecting means for detecting the position of the exposure ring 102 to set an initial point of the automatic exposure adjustment.

The exposure position detection means comprises, as shown in FIGS. 13 and 14, a photo reflector 124 located on the motor base 116 and a reflecting plate 129 located on a projected end 101b of the shutter base 101. The exposure position detection means is designed such that the projection 111b of the open lever 111 rotating in association with the rotation of the exposure ring 102 is located between the reflector 124 and the reflecting plate 127. That is, the photo reflector 124 is designed detecting the initial position by detecting infrared rays reflected on the reflecting plate 129 in accordance with the position of the projection 111b of the open lever 111.

Different aspects of the second embodiment from the first embodiment in the operation will be described hereinafter.

The operation of the above-described electronic shutter will be described hereinafter in conjunction with the accompanying drawings 9 and 10.

FIG. 14 shows the shutter that is activated by the main power turned to an on-state, and FIG. 16 shows the shutter that is in a stand-by state by the main power turned to an off-state. In the stand-by state of the shutter, as shown in FIG. 16, since the signal detecting projection 128c of the focus ring 128 is deviated from the photo interrupter 108, the detected value becomes the low value L. In this state, when counterclockwise pulse is applied to the stepping motor 121 at the predetermined number, the gear 123 rotates. The rotational force of the gear 123 is transmitted to the reduction gears 113, 114 and 115 to move the signal detecting projection 128c of the focus ring 128 to a position corresponding to the main power-on position in FIG. 22. On the contrary, when clockwise pulses are applied to the stepping motor 121 at the predetermined number, the gear 123 and the reduction gears 113, 114 and 115 rotate in the opposite direction to move the focus ring 128 to a position corresponding to the main power-off position in FIG. 22, thereby realizing a locking state between the hook step 128b and the suppressing end 111d as shown in FIG. 16.

The above-described mechanical locking state prevents the sectors from opening even when the outer shock is applied.

Figure 23:
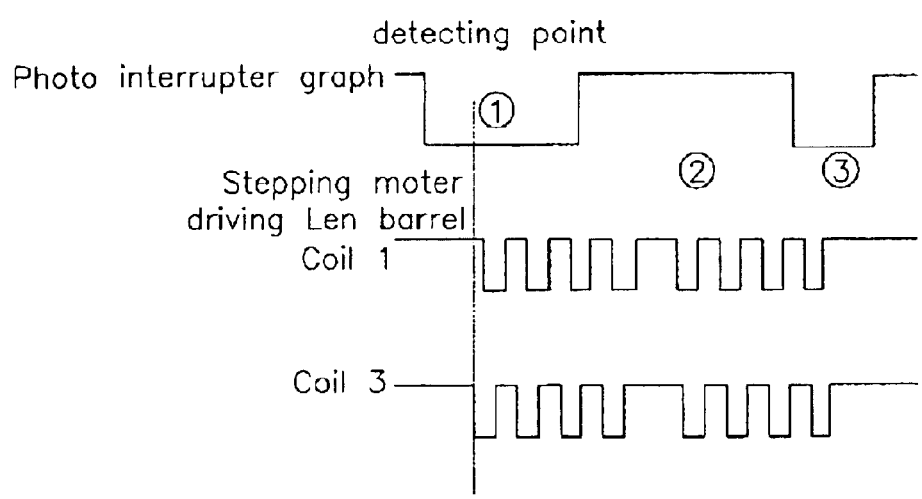
FIGS. 23 to 25 are views illustrating a control procedure when there is a normal or error message in the course of the initial position setting of a shutter.
Figure 24:
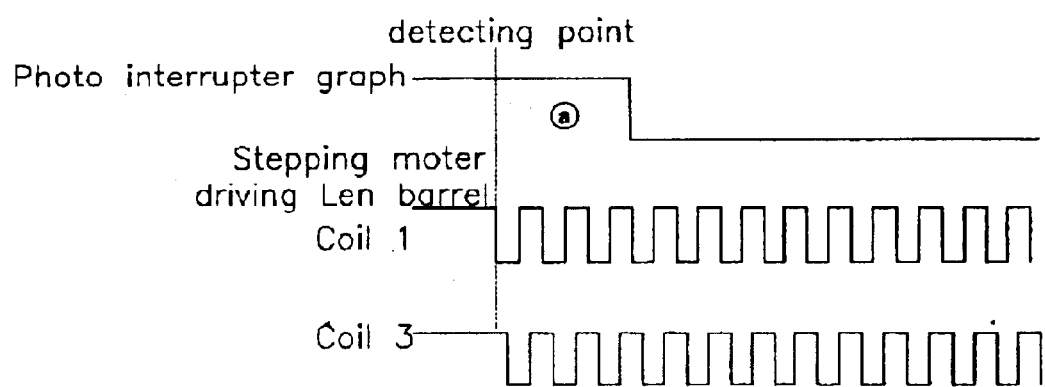
Figure 25:
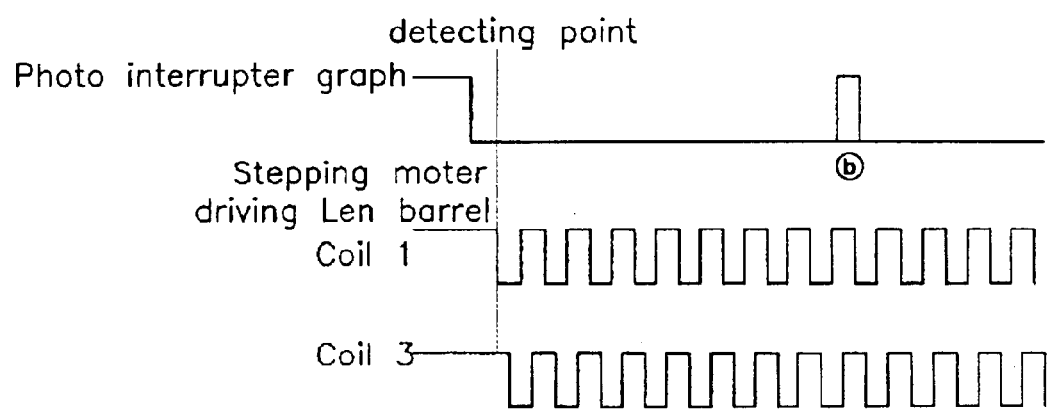

FIGS. 23 to 25 show a graphical illustration of a flow for detecting an initial position of the focus ring 128 at normal and error positions.

First, the initial position detecting procedure at the normal position will be described.

As shown in FIG. 23, it is first detected if the detected value of the photo interrupter 108 is a low value L (①), and when the detected value is the low value L, the counterclockwise pulse is applied to the stepping motor 121 as many as the predetermined number. Then, it is determined if the signal is varied from the low value L to the high value H (②). At this point, the predetermined number of pulse is set to be multiple of eight (8) so as to identical to the initial phase of the stepping motor. Then, the stepping motor 121 is reversed by applying clockwise pulses as many as the predetermined number and the stopped position (③) is set as the initial position. At this point, the coils 1 and 3 (c1 and c3) of the stepping motor are in the high value H state. That is, when the focus ring 128 rotates counterclockwise by applying the high value to the coils 1 and 3 (c1 and c3) and the signal of the photo interrupter 108 is accurately varied from the low value L to the high value H within the predetermined number of pulses, it can be assumed that the focus ring 128 is in the normal position. Therefore, the stepping motor is rotated as many as the predetermined pulses so that it can be returned to the initial position.

FIGS. 24 and 25 show a graphical illustration of a flow for detecting an initial position of the focus ring 128 at an error position.

As shown in FIG. 24, when the photo interrupter 108 is in the high value H state (ⓐ), this means that the signal detecting projection 128c of the focus ring 128 is positioned in the photo interrupter 108. Therefore, the stepping motor 121 is rotated counterclockwise as many as the predetermined number of pulses so that the projection 128a of the focus ring 128 closely contacting the stopper projection 101c of the shutter base 101, and the main power-on control is performed (the predetermined number of clockwise pulses are applied to the stepping motor) so as to return the shutter to the normal position, after which the initial identification flow of the normal state is performed.

FIG. 25 shows a case (ⓑ) where the detected value of the photo interrupter 108 is not varied from the low value L to the high value H although the detected value of the photo interrupter 108 is the low value at the starting point of the stepping motor 121.

In this case, since it is the error condition where the signal detecting projection 128c of the focus ring 128 is positioned out of the normal position in the photo interrupter 108, when the photo interrupter signal detection and determination are completed, the stepping motor 121 is rotated counterclockwise as many as the predetermined pulses so that the projection 128a of the focus ring 128 contacts the stopper projection 101c of the shutter base 101, and the main power-on control (clockwise pulse is applied to the stepping motor) to return the shutter to the normal position, after which the initial identification flow at the normal state is performed.

The sector opening/closing operation of the second embodiment will be described hereinafter.

The sector closing operation will be first described. When the exposure motor 118 is controlled such that the projection 120a of the lever 120 rotates clockwise, the first open gear 109 rotates clockwise as the projection 120a contacts the projection 109a of the first open gear 109 (see FIGS. 14–15, 19). Then, the gear portion 109b of the first open gear 109 is engaged with the gear portion 110a of the second open gear 110 to rotate the second open gear 110 counterclockwise in FIG. 14. In addition, the gear portion 110b of the second open gear 110 is engaged with the gear portion 111a of the open lever 111 to rotate the open lever 111 clockwise in FIG. 14. The rotational force of the open lever 111 is transmitted to the open lever gear 127 through the projection 111c, and, as shown in FIG. 17, the exposure ring rotates clockwise so that the sectors 104, 105 and 106 rotate in the closing direction by the driving projection 102c.

At this point, the open lever spring 112 has elastic force returning to its initial position, and this elastic force is maintained by the magnetic force and mechanical structure of the exposure motor 118. In this state, when the electric power is applied to the motor 121 to rotate the focus ring 128 to a predetermined section, the suppression of the open lever 111 is released to move the lens barrel 125 to a desired position. In addition, when electric power is applied to the exposure motor 118, as shown in FIG. 14, the lever 120 rotates counterclockwise, and when the suppression of the open lever spring 112 is released, the open lever 111 rotates counterclockwise in FIG. 14. The rotational force of the open lever 111 is transmitted to the first and second open gears 110 and 109 and rotates the open lever gear 127 clockwise in FIG. 17. The exposure ring 102 rotates counterclockwise in response to the rotation of the open lever gear 127 to open the sectors 104, 105 and 106. Accordingly, the exposure is realized. After a lapse of predetermined time, when electric power is reversibly applied to the exposure motor 118, the lever rotates clockwise to close the sectors 104, 105 and 106 according to the above-described closing procedure.

The initial position detection of the exposure is identical to that of the first embodiment, the detailed description thereof will be omitted herein. However, in the second embodiment, a portion passing through a space defined between the photo reflector 124 and the reflecting plate 129 becomes the projection 111b of the open lever 111.

As described above, since a can-type driving motor is used as a driving source for focus and exposure operation, the freedom of design can be improved. In addition, since an iris composed preferably of three sectors is employed, the large aperture can be realized. Furthermore, the locking structure for preventing the sectors from opening even when outer shock is applied in a main power-off state of the camera increases the reliability of the camera.

In addition, in the course of setting the initial position of the camera, since the signal of the photo interrupter is detected and the number of photo interrupter is counted, the deviation of the initial position of the camera can be remarkably reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An electronic shutter for a camera, comprising:

first driving force generating means for generating driving force for moving a lens barrel in a direction of an optical axis;

lens barrel moving means for moving the lens barrel by use of driving force from the first driving force generating means;

adjusting means for adjusting a focus ring to an initial position when electric power is applied or a shutter release operation is applied;

second driving force generating means for generating driving force for driving a plurality of sectors;

sector opening/closing means for opening and closing the sectors by use of driving force from the second driving force generating means, the sector opening/closing means including a plurality of power transmission elements coupled with one another in connection with the second driving force generating means for driving the sectors;

exposure position detection means for detecting an exposure position by cooperating with the sector opening/closing means; and sector open preventing means for preventing the sectors from opening when outer shock is applied in a main power-off state, the sector open preventing means including a hook step disposed at the focus ring, and a suppression end disposed at one of the plurality of power transmission elements so as to selectively contact the hook step of the focus ring.

2. The electronic shutter of claim 1 wherein the first driving force generating means and the second driving force generating means respectively include a can-type stepping motor.

3. The electronic shutter of claim 1 wherein the lens barrel moving means comprises plural speed reduction gears mounted on the shutter base to receive driving force from the first driving force generating means, and wherein the focus ring coupled on the shutter base is rotatable by the rotational force from the reduction gears, the focus ring including a projection extending toward the direction of the optical axis to rotate and move the lens barrel in the direction of the optical axis.

4. The electronic shutter of claim 1 wherein the exposing position detecting means comprises:

a photo reflector located on a motor base;

a reflecting plate located on a shutter base; and an open lever rotatably coupled on the shutter base, the open lever being provided with a projection moveable between the photo reflector and the reflecting plate and rotating in response to rotation of the exposing ring.

5. The electronic shutter of claim 1, wherein the hook step is formed on the focus ring in the direction of the optical axis and the suppression end is formed on an open lever in a radial direction for contacting with the hook step of the focus ring.

6. The electronic shutter of claim 1 wherein the plurality of power transmission elements of the sector opening/closing means comprises:

a lever rotating by the first driving force generating means, the lever being provided with a projection extending the direction of the optical axis at an eccentric location;

a first open gear rotatably surface contacting the projection of the lever, the first open gear being provided at its outer circumference with a gear and rotatably coupled on the shutter base;

a second open gear coupled to the shutter base and engaged with the gear of the first open gear;

an open lever coupled on the shutter base to be rotatable by the rotational force of the second open gear, the open lever being provided with a projection in the direction of the optical axis;

an open lever gear for receiving the rotational force by the projection of the open lever; and an exposing ring coupled on the shutter base to be rotatable by the rotational force of the open lever gear, the exposing ring being provided with a projection fitted in the sectors to move the sectors.

7. The electronic shutter of claim 6, further comprising an open lever spring having a first end elastically supported on the open lever and a second end elastically supported on the shutter base.

8. An electronic shutter of a camera, comprising:
first driving force generating means for generating a driving force for moving a lens barrel in a direction of an optical axis;
a focus ring rotatably coupled with a shutter base for moving the lens barrel in the direction of the optical axis by use of the driving force from the first driving force generating means;
means for detecting and adjusting an initial position of the focus ring when electric power is applied or a shutter release operation is applied;
second driving force generating means for generating a driving force for driving a plurality of sectors;
an exposure ring rotatable coupled to the shutter base, the exposure ring having at least one driving projection for opening and closing of the sectors and operable in response to the driving force from the second driving force generating means;
an open lever rotatably coupled to the shutter base, the open lever including a first end portion rotatably coupled with the exposure ring and a second end portion having a laterally extending projection, the open lever rotatable in response to rotation of the exposure ring; and
sensing means for detecting a position of the lateral projection of the open lever for detecting an exposure position of the camera.

9. The electronic shutter of claim 8 wherein the sensing means includes a photo reflector disposed adjacent to a motor base and a reflecting plate disposed adjacent to the shutter base.

10. The electronic shutter of claim 8, further comprising a connection gear rotatable in connection with the driving force of the second driving force generating means, and wherein the exposure ring has a projection engageable by the connection gear for rotating the exposure ring toward a direction for closing the sectors.

11. The electronic shutter of claim 10, wherein the connection gear has at least one axially extending projection for engaging the projection of the exposure ring.

12. The electronic shutter of claim 10, further comprising an open lever spring having a first end elastically supported on the open lever and a second end elastically supported on the shutter base, the open lever spring biased toward a direction for opening the sectors.

13. An electronic shutter for a camera, comprising:
a drive motor coupled en a motor base to generate drive force for driving a lens barrel;
a focus ring coupled on the shutter base to move the lens barrel by being rotated by the drive force from the motor, the focus ring including a hook step projected in a direction of an optical axis;
an exposure motor coupled on the motor base to generate drive force for driving a sector;
an open lever rotatably coupled on a shutter base by the drive force of the exposure motor, the open lever including a suppression end projection in a circumferential direction so as to selectively contact the hook step of the focus ring;
an open lever spring having a first side elastically biased on the open lever and a second side elastically biased on the shutter base; and
an exposure ring rotatably coupled on the shutter base to move the sector by receiving rotational force from the open lever.

14. A method for controlling an electronic shutter for a camera, the shutter having a photo interrupter coupled with a stepping motor, and control means including a plurality of counters for counting the number of drive pulse signals, comprising the steps of:
(S1) clearing counter_1 and counter_2 values detected by the photo interrupter to a value "0";
(S3) controlling driving pulses such that a focus ring rotates counterclock-wise by driving a stepping motor;
(S5) determining if the detected value of the photo interrupter is a high value;
(S7) increasing the counter_1 value by 1 when the value detected by the photo interrupter is the high value;
(S9) determining if the increase value of counter_1 is consecutively detected above predetermined times;
(S11) controlling the pulses such that the focus ring rotates clockwise when the value of the counter_1 is increased as many as the predetermined times;
(S13) determining if the value detected by the photo interrupter is a low value;
(S15) determining if the value applied to first and third coils of the stepping motor is the high value when the determined value is the lower value; and
(S19) turning off the power of the stepping motor when the condition of the step (S15) is satisfied.

15. The method of claim 14 further comprising the step of returning the control procedure to the step (S3) when the increase value of counter_1 is not consecutively detected above the predetermined times in the step (S8).

16. The method of claim 14 further comprising the step of returning the control procedure to the step (S11) when the determined value is not the low value in the step (S13).

17. The method of claim 14 further comprising the step of (S17) controlling the pulse to rotate the focus ring clockwise when the value is not the high value in the step (S15) to return the control procedure to the step (S15).

18. The method of claim 14 further comprising the steps of:
(S21) increasing the counter_2 value by 1 when the valve value detected by the photo interrupter is not the high value in the step (S5);
(S23) determining if the counter_2 value is above predetermined value;
(S25) controlling the focus ring to rotate clockwise when the condition of the step (S23) is satisfied in the step (S23);
(S27) determining if the value detected by the photo interrupter is the high value;
(S29) increasing the counter_1 value by 1 when the value is the high value in the step (S27); and
(S31) determining if the value of the counter_1 is above a predetermined value and when this condition is not satisfied, the control procedure is returned to the step (S25), and when satisfied, the control procedure is returned to the step (S13).

19. The method of claim 18 further comprising the step of returning the control procedure to the step (S3) when the counter_2 value is above the predetermined value in the step (S23).

20. The method of claim 18 further comprising the step of keeping driving the focus ring clockwise when the value is not the high value in the step (S27).

* * * * *